(12) United States Patent
Masushige et al.

(10) Patent No.: US 12,421,411 B2
(45) Date of Patent: Sep. 23, 2025

(54) AQUEOUS INK COMPOSITION FOR REVERSIBLY THERMOCHROMIC WRITING INSTRUMENT, AND REFILL AND AQUEOUS BALLPOINT PEN INCORPORATING AQUEOUS INK COMPOSITION FOR REVERSIBLY THERMOCHROMIC WRITING INSTRUMENT

(71) Applicant: KABUSHIKI KAISHA PILOT CORPORATION, Tokyo-to (JP)

(72) Inventors: Naoto Masushige, Tokyo-to (JP); Mamiko Ogura, Tokyo-to (JP); Itsuka Ohno, Tokyo-to (JP)

(73) Assignee: KABUSHIKI KAISHA PILOT CORPORATION, Tokyo-to (JP)

( * ) Notice: Subject to any disclaimer, the term of this patent is extended or adjusted under 35 U.S.C. 154(b) by 982 days.

(21) Appl. No.: 17/602,066

(22) PCT Filed: Mar. 30, 2020

(86) PCT No.: PCT/JP2020/014445
§ 371 (c)(1),
(2) Date: Apr. 12, 2022

(87) PCT Pub. No.: WO2020/209118
PCT Pub. Date: Oct. 15, 2020

(65) Prior Publication Data
US 2022/0251406 A1 Aug. 11, 2022

(30) Foreign Application Priority Data
Apr. 11, 2019 (JP) ................................. 2019-075890
Apr. 12, 2019 (JP) ................................. 2019-076696

(51) Int. Cl.
*C09D 11/50* (2014.01)
*B43K 1/08* (2006.01)
(Continued)

(52) U.S. Cl.
CPC ................ *C09D 11/50* (2013.01); *B43K 1/08* (2013.01); *B43K 7/02* (2013.01); *B43K 29/02* (2013.01); *C09D 11/17* (2013.01); *C09D 11/18* (2013.01)

(58) Field of Classification Search
CPC ........... B43K 1/08; B43K 1/086; B43K 7/02; B43K 29/02; C09D 11/17; C09D 11/18; C09D 11/50
See application file for complete search history.

(56) References Cited

U.S. PATENT DOCUMENTS 6,331,203 B2    12/2001  Hattori et al.
2019/0047318 A1*  2/2019  Kajiwara ............... C09D 11/18

FOREIGN PATENT DOCUMENTS

CN    1749336      3/2006
EP    3 135 738    3/2017
(Continued)

OTHER PUBLICATIONS

Machine translation of detailed description of JP 2009-292878 acquired on Oct. 16, 2024.*

(Continued)

*Primary Examiner* — Gerard Higgins
(74) *Attorney, Agent, or Firm* — Wenderoth, Lind & Ponack, L.L.P.

(57) ABSTRACT

A reversibly thermochromic aqueous ink composition having excellent writability and few problems such as aggregation of a colorant, an increase in viscosity of the composition, or a decrease in handwriting density, and a refill or an aqueous ballpoint pen using the reversibly thermochromic aqueous ink composition. The reversibly thermochromic composition is a reversibly thermochromic aqueous ink composition containing a reversibly thermochromic microcapsule pigment encapsulated in a microcapsule formed from an organic resin, an N-vinyl-2-pyrrolidone polymer, (Continued)

glycerin, and water, in which when contents (% by mass) of the reversibly thermochromic microcapsule pigment, the N-vinyl-2-pyrrolidone polymer, and the glycerin with respect to a total mass of the ink composition are $P_{MC}$, $P_{PVP}$, and $P_G$, respectively, $0.3 \leq P_{MC}/(P_{PVP}+P_G) \leq 4$, and $0.2 \leq P_{PVP}/P_G \leq 5$, and a refill or an aqueous ballpoint pen incorporating the reversibly thermochromic aqueous ink composition.

9 Claims, 4 Drawing Sheets

(51) Int. Cl.
 *B43K 7/02* (2006.01)
 *B43K 29/02* (2006.01)
 *C09D 11/17* (2014.01)
 *C09D 11/18* (2006.01)

(56) References Cited

FOREIGN PATENT DOCUMENTS

| | | |
|---|---|---|
| EP | 3 333 240 | 6/2018 |
| EP | 3 398 787 | 11/2018 |
| JP | 51-44706 | 11/1976 |
| JP | 51-44707 | 11/1976 |
| JP | 60-63265 | 4/1985 |
| JP | 1-29398 | 6/1989 |
| JP | 4-17154 | 3/1992 |
| JP | 7-33997 | 2/1995 |
| JP | 7-179777 | 7/1995 |
| JP | 8-39936 | 2/1996 |
| JP | 11-5973 | 1/1999 |
| JP | 11-129623 | 5/1999 |
| JP | 2001-105732 | 4/2001 |
| JP | 2003-253149 | 9/2003 |
| JP | 2006-206823 | 8/2006 |
| JP | 2006-335848 | 12/2006 |
| JP | 2009-292878 | 12/2009 |
| JP | 2013-122058 | 6/2013 |
| JP | 2014-122269 | 7/2014 |
| JP | 2015-10124 | 1/2015 |
| JP | 2018-69548 | 5/2018 |
| KR | 10-2018-0101422 | 9/2018 |
| TW | 1368636 | 7/2012 |
| WO | WO-2017115725 A1 * | 7/2017 ............... B43K 1/08 |

OTHER PUBLICATIONS

Notice of Reasons for Refusal issued Oct. 17, 2023 in corresponding Japanese Patent Application No. 2021-513578, with English language translation.

Taiwan Office Action issued Mar. 5, 2024 in corresponding Taiwan Patent Application No. 109111235, with English machine translation.

Extended European Search Report issued Nov. 29, 2022, in corresponding European Patent Application No. 20786835.7.

International Preliminary Report on Patentability and Written Opinion of the International Searching Authority issued Sep. 28, 2021 in International (PCT) Application No. PCT/JP2020/014445.

International Search Report (ISR) issued Jun. 16, 2020 in International (PCT) Application No. PCT/JP2020/014445.

Office Action issued Jun. 15, 2023, in Indian Patent Application No. 202117045903.

Office Action issued Jun. 2, 2022, in corresponding Chinese Patent Application No. 202080033487.7, with English translation.

Office Action issued Nov. 27, 2024 in Korean Patent Application No. 10-2021-7036406, with English-language Translation.

* cited by examiner (A)

(B)

(A)

(B)

AQUEOUS INK COMPOSITION FOR REVERSIBLY THERMOCHROMIC WRITING INSTRUMENT, AND REFILL AND AQUEOUS BALLPOINT PEN INCORPORATING AQUEOUS INK COMPOSITION FOR REVERSIBLY THERMOCHROMIC WRITING INSTRUMENT

TECHNICAL FIELD

The present invention relates to an aqueous ink composition for reversibly thermochromic writing instrument, and a refill and an aqueous ballpoint pen incorporating the aqueous ink composition for reversibly thermochromic writing instrument. More specifically, the present invention relates to an aqueous ink composition for reversibly thermochromic writing instrument which exhibits reversible thermochromism between coloring and decoloring with showing a large hysteresis characteristic upon changing temperature and keeps either of the colored state and decolored state alternately and reversibly even after removal of application of the heat or cold required for the discoloration, and to a refill and an aqueous ballpoint pen incorporating the aqueous ink composition for reversibly thermochromic writing instrument.

BACKGROUND ART

An aqueous ink composition for reversibly thermochromic writing instrument that can form a handwriting and the like that can memorize and keep alternately states before and after a color change in a certain temperature range such as an ordinary temperature region, and a writing instrument incorporating the aqueous ink composition for reversibly thermochromic writing instrument have been heretofore proposed. A wide variety of such writing instruments have been proposed, such as a ballpoint pen, a marking pen, a fountain pen, and a solid writing material. In a writing instrument incorporating the aqueous ink composition for reversibly thermochromic writing instrument, thermochromism is important performance; however, similarly to a general writing instrument, it is desired that various performances such as writability, handwriting density, and light resistance are also high. However, since a colorant used in a thermochromic composition is relatively special, it is difficult to obtain excellent properties even if the same materials and blending ratios as those of general ink compositions are employed. In particular, when a microcapsule pigment in which a reversibly thermochromic composition is encapsulated in a microcapsule is used, it may be necessary to increase the blending ratio of a pigment in order to achieve a high density, and it is difficult to apply a conventional ink composition ratio as it is.

In particular, although the aqueous ink composition for reversibly thermochromic writing instrument contains an organic material as a reversibly thermochromic colorant, an interaction with other organic materials contained in the composition may occur. For example, aggregation of organic colorant particles, an increase in viscosity of the composition, a decrease in the handwriting density, deterioration in the writability, and the like may occur.

CITATION LIST

Patent Literature

Patent Literature 1: JP 2009-292878 A

SUMMARY OF INVENTION

Technical Problem

An object of the present invention is to solve problems in an aqueous ink composition for writing instrument containing a reversibly thermochromic colorant, and to simultaneously improve various properties.

Solution to Problem

A reversibly thermochromic aqueous ink composition according to the present invention includes
 a reversibly thermochromic microcapsule pigment in which a reversibly thermochromic composition including (a) an electron-donating color-developing organic compound, (b) an electron-accepting compound, and (c) a reaction medium to determine an occurrence temperature of a coloring reaction of the component (a) and the component (b) is encapsulated in a microcapsule comprising an organic resin,
 an N-vinyl-2-pyrrolidone polymer having a degree of polymerization of 2 to 20,
 glycerin, and
 water, and in this reversibly thermochromic aqueous ink composition,
 when contents (% by mass) of the reversibly thermochromic microcapsule pigment, the N-vinyl-2-pyrrolidone polymer, and the glycerin with respect to a total mass of the ink composition are $P_{MC}$, $P_{PVP}$, and $P_G$, respectively, $$0.3 \leq P_{MC}/(P_{PVP}+P_G) \leq 4, \text{ and}$$

$$0.2 \leq P_{PVP}/P_G \leq 5.$$

A refill according to the present invention is characterized by incorporating the reversibly thermochromic ink composition.

An aqueous ballpoint pen according to the present invention is characterized by incorporating the reversibly thermochromic ink composition.

Advantageous Effects of Invention

According to the present invention, there is provided a reversibly thermochromic ink composition having writability, in particular, less blurring at the start of writing even when a pen tip is dried. In addition, this ink composition is also excellent in an effect of suppressing aggregation of organic colorant particles, an increase in viscosity of the composition, a decrease in handwriting density, and the like.

DESCRIPTION OF EMBODIMENTS

An embodiment of the present invention will be described in detail below.

<<Aqueous Ink Composition for Reversibly Thermochromic Writing Instrument>>

An aqueous ink composition for reversibly thermochromic writing instrument (hereinafter, may be simply referred to as an "ink composition") according to the present invention contains a reversibly thermochromic microcapsule pigment, a polymer of N-vinyl-2-pyrrolidone, glycerin, and water. Each of these components will be described in detail below.

<Reversibly Thermochromic Microcapsule Pigment>

In the present invention, a reversibly thermochromic microcapsule pigment (hereinafter, may be simply referred to as "microcapsule pigment") includes (a) an electron-donating color-developing organic compound, (b) an electron-accepting compound, and (c) a reaction medium which reversibly induces an electron transfer reaction between the component (a) and the component (b) in a specific temperature range.

Figure 1:
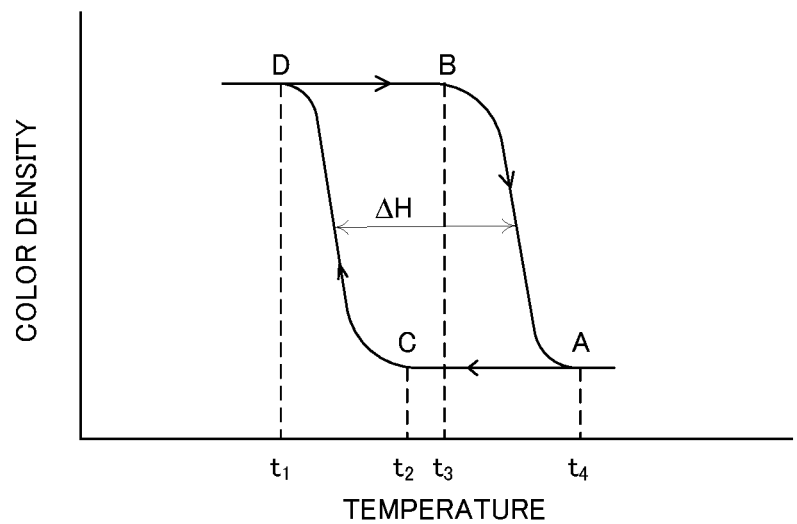
FIG. 1 is a graph for explaining a hysteresis characteristic of a thermochromic color-memory composition in a color density-temperature curve.

As the microcapsule pigment, it is possible to use a microcapsule pigment described in JP S51-44706 B, JP S51-44707 B, JP H1-29398 B, etc. These microcapsule pigments change color above and below a predetermined temperature (color changing point), exhibit a decolored state in a temperature range not lower than an upper color changing point, and exhibit a colored state in a temperature range not higher than a lower color changing point. The microcapsule pigments have characteristics in which only one specific state, of the both states, exists in an ordinary temperature region, and the other state is maintained while heat or cold required for the other state to be expressed is being applied, but the state in the ordinary temperature region is restored once the application of heat or cold is terminated. Here, the composition contained in these microcapsule pigments is a reversibly thermochromic composition of heat-decoloring type (decolored when heated, and colored when cooled) having characteristics in which a temperature range representing a degree of hysteresis (hereinafter referred to as a hysteresis width $\Delta H$) is relatively small ($\Delta H=1$ to $7°$ C.) (see FIG. 1).

Also, it is possible to use a microcapsule pigment described in JP H4-17154 B, JP H7-179777 A, JP H7-33997 A, JP H8-39936 A, etc. These microcapsule pigments exhibit a relatively large hysteresis characteristic ($\Delta H=8$ to $50°$ C.). That is, the color changes along very different paths in the curve of plots showing color development density change with temperature change between when the temperature increases from a region lower than the discoloration range and when the temperature decreases from a region higher than the discoloration range (see FIG. 2).

The hysteresis characteristics of the reversibly thermochromic composition in a color density-temperature curve will be described in detail below with reference to the drawings.

Figure 2:
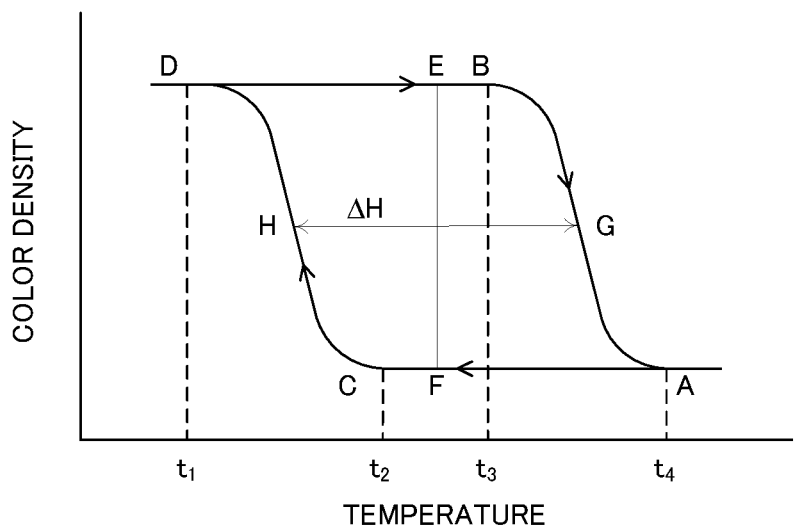
FIG. 2 is a graph for explaining the hysteresis characteristic of another thermochromic color-memory composition in the color density-temperature curve.

In FIG. 2, the color density is plotted on the ordinate and the temperature is plotted on the abscissa. A change in the color density due to temperature change proceeds along the arrow. Here, A is a point showing the density at a temperature $t_4$ at which a completely decolored state is achieved (hereinafter referred to as complete decoloring temperature); B is a point showing the density at a temperature $t_3$ at which decoloring starts (hereinafter referred to as decoloring starting temperature); C is a point showing the density at a temperature $t_2$ at which coloring starts (hereinafter referred to as coloring starting temperature); and D is a point showing the density at a temperature $t_1$ at which a completely colored state is achieved (hereinafter referred to as complete coloring temperature).

The discoloration temperature range is a temperature range between $t_1$ and $t_4$ where a colored state or a decolored state can be provided, and a temperature range between $t_2$ and $t_3$ where difference in color density is large is an essentially two-phase retaining temperature range.

A length of a line segment EF is a measure showing contrast of discoloration, and a length of a line segment HG passing through a midpoint of the line segment EF is the hysteresis width $\Delta H$. When this $\Delta H$ value is small, only specified state of both states before and after discoloration can exist in the ordinary temperature region. When the $\Delta H$ value is large, it is easy to keep each state before and after discoloration.

As the reversibly thermochromic composition having a color-memory property, specifically, it can be effectively functioned for the retention of color shown at an ordinary state (daily life temperature region) by specifying the complete coloring temperature $t_1$ to a temperature obtained only in a freezer, a cold district, and the like, i.e., a range of $-50$ to $0°$ C., preferably $-40$ to $-5°$ C., more preferably $-30$ to $-10°$ C. and the complete decoloring temperature $t_4$ to a temperature obtained from frictional heat generated with a frictional body or a familiar heating body such as a hair dryer, i.e., a range of 45 to $95°$ C., preferably 50 to $90°$ C., more preferably 60 to $80°$ C. and specifying the $\Delta H$ value to 40 to $100°$ C.

Specific compounds to be used as the respective components (a), (b), and (c) will be exemplified below.

The component (a) of the present invention, namely, an electron-donating color-developing organic compound, is a color-determining component which develops a color by donating an electron(s) to the component (b), which is a color developer.

Examples of the electron-donating color-developing organic compound include phthalide compounds, fluoran compounds, styrynoquinoline compounds, diazarhodamine lactone compounds, pyridine compounds, quinazoline compounds, and bisquinazoline compounds, among which phthalide compounds and fluoran compounds are preferred.

Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds, among which phenylindolyl azaphthalide compounds and their derivatives are preferred.

Examples of the fluoran compounds include aminofluoran compounds, alkoxyfluoran compounds, and derivatives of these compounds.

Hereinafter, compounds that can be used for the component (a) are exemplified. 3,3-bis(p-dimethylaminophenyl)-6-dimethylaminophthalide,
3-(4-diethylaminophenyl)-3-(1-ethyl-2-methylindol-3-yl) phthalide,
3,3-bis(1-n-butyl-2-methylindol-3-yl)phthalide,
3,3-bis(2-ethoxy-4-diethylaminophenyl)-4-azaphthalide,
3-(2-ethoxy-4-diethylaminophenyl)-3-(1-ethyl-2-methylindol-3-yl)-4-azaphthalide,
3-(2-hexyloxy-4-diethylaminophenyl)-3-(1-ethyl-2-methylindol-3-yl)-4-azaphthalide,
3-[2-ethoxy-4-(N-ethylanilino)phenyl]-3-(1-ethyl-2-methylindol-3-yl)-4-azaphthalide,
3-(2-acetamido-4-diethylaminophenyl)-3-(1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(3-trifluoromethylanilino)-6-dipentylaminofluoran,
2-dibenzylamino-6-diethylaminofluoran,
2-N-methylanilino-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xylidino-3-methyl-6-diethylaminofluoran,
2-anilino-3-methyl-6-(N-ethyl-N-p-tolylamino)fluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-[1]benzopyrano[2,3-d]pyrimidine-5,1'(3'H) isobenzofuran]-3'-one,
2-diethylamino-8-diethylamino-4-methyl, spiro[5H-[1]benzopyrano[2,3-d]pyrimidine-5,1'(3'H) isobenzofuran]-3'-one,
2-di-n-butylamino-8-di-n-butylamino-4-methyl, spiro[5H-[1]benzopyrano[2,3-d]pyrimidine-5,1'(3'H) isobenzofuran]-3'-one,
2-di-n-butylamino-8-diethylamino-4-methyl, spiro[5H-[1]benzopyrano[2,3-d]pyrimidine-5,1'(3'H) isobenzofuran]-3'-one,
2-di-n-butylamino-8-(N-ethyl-N-i-amylamino)-4-methyl, spiro[5H-[1]benzopyrano[2,3-d]pyrimidine-5,1'(3'H) isobenzofuran]-3'-one,
2-dibutylamino-8-dipentylamino-4-methyl,
4,5,6,7-tetrachloro-3-(4-dimethylamino-2-methoxyphenyl)-3-(1-butyl-2-methyl-1H-indol-3-yl)-1(3H)-isobenzofuranone,
4,5,6,7-tetrachloro-3-(4-diethylamino-2-ethoxyphenyl)-3-(1-ethyl-2-methyl-1H-indol-3-yl)-1(3H)-isobenzofuranone,
4,5,6,7-tetrachloro-3-(4-diethylamino-2-ethoxyphenyl)-3-(1-pentyl-2-methyl-1H-indol-3-yl)-1(3H)-isobenzofuranone,
4,5,6,7-tetrachloro-3-(4-diethylamino-2-methylphenyl)-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthene]-3-one,
3',6'-bis[phenyl(3-ethylphenyl)amino]-spiro[isobenzofuran-1(3H),9'-[9H]xanthene]-3-one,
2,6-bis(2'-ethyloxyphenyl)-4-(4'-dimethylaminophenyl) pyridine,
2,6-bis(2',4'-diethyloxyphenyl)-4-(4'-dimethylaminophenyl) pyridine,
2-(4'-dimethylaminophenyl)-4-methoxyquinazoline, and
4,4'-ethylenedioxy-bis[2-(4-diethylaminophenyl)quinazoline]

The fluorans may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chloro group).

The component (b), namely an electron-accepting compound, is a compound which receives an electron(s) from the component (a) and functions as a color developer of the component (a).

Examples of the electron-accepting compound include active proton-containing compounds; pseudo-acidic compounds (compounds which are not acids but each act as an acid in a composition to cause the component (a) to develop a color); and compounds with electron vacancies. Among these, the component (b) is preferably a compound selected from active proton-containing compounds.

Examples of the compounds having active protons include phenolic hydroxy group-containing compounds and derivatives thereof, carboxylic acids and derivatives thereof, preferably aromatic carboxylic acids and derivatives thereof, aliphatic carboxylic acids having 2 to 5 carbon atoms and derivatives thereof, 2-hydroxycarboxylic acid derivatives, N-substituted amino acid derivatives, acidic phosphoric acid esters and derivatives thereof, acidic phosphoric esters and derivatives thereof, azole-based compounds and derivatives thereof, 1,2,3-triazole and derivatives thereof, cyclic carbosulfoimides, halohydrins having 2 to 5 carbon atoms, sulfonic acids and derivatives thereof, and inorganic acids.

Examples of the pseudo-acidic compounds include metal salts of the phenolic hydroxy group-containing compounds, metal salts of the carboxylic acids, metal salts of the acidic phosphoric esters, metal salts of the sulfonic acids, aromatic carboxylic anhydrides, aliphatic carboxylic anhydrides, anhydrides of mixed acids of aromatic carboxylic acids and sulfonic acids, cycloolefin dicarboxylic anhydrides, urea and derivatives thereof, thiourea and derivatives thereof, guanidine and derivatives thereof, and halogenated alcohols.

Examples of the compounds having electron holes include borates, borate esters, and inorganic salts.

Among these compounds, the phenolic hydroxy group-containing compound is preferable because effective thermochromic properties can be developed.

The phenolic hydroxy group-containing compounds include a wide range of compounds, ranging from monophenol compounds to polyphenol compounds, and bis-type tris-type phenols, phenol-aldehyde condensation resins and the like are also included therein. Among the phenolic hydroxy group-containing compounds, those which contain at least two benzene rings are preferred. Further, these compounds may also have a substituent, examples of which include an alkyl group, an aryl group, an acyl group, an alkoxycarbonyl group, a carboxy group and an ester thereof, as well as an amide group and a halogen group.

Examples of the metal contained in the metal salts of the phenolic hydroxy group-containing compound and the like include sodium, potassium, calcium, zinc, zirconium, aluminum, magnesium, nickel, cobalt, tin, copper, iron, vanadium, titanium, lead, and molybdenum.

Examples of the compound having one phenolic hydroxy group include
phenol,
o-cresol,
m-cresol,
p-cresol,
4-ethylphenol,
4-n-propylphenol,
4-n-butylphenol,
2-tert-butylphenol,
3-tert-butylphenol,
4-tert-butylphenol,
4-n-pentylphenol,
4-tert-pentylphenol,
4-n-octylphenol,
4-tert-octylphenol,
4-n-nonylphenol,
4-n-dodecylphenol,
3-n-pentadecylphenol,
4-n-stearylphenol,
1-(4-hydroxyphenyl)decane-1-one,
4-chlorophenol,
4-bromophenol,
4-trifluoromethylphenol,
4-methylthiophenol,
4-nitrophenol,
2-phenylphenol,
4-phenylphenol,
2-benzylphenol,
2-benzyl-4-chlorophenol,
4-cumylphenol,
4-hydroxybenzophenone,
4,4'-dihydroxybenzophenone,
4-chloro-4'-hydroxybenzophenone,
4-fluoro-4'-hydroxybenzophenone,
4-cyclohexylphenol,
2-hydroxybenzyl alcohol,
3-hydroxybenzyl alcohol,
4-hydroxybenzyl alcohol,
4-(2-hydroxyethyl)phenol,
3-methoxyphenol,
4-ethoxyphenol,
4-n-propoxyphenol,
4-n-butoxyphenol,
4-n-heptyloxyphenol,
4-(2-methoxyethyl)phenol,
α-naphthol,
β-naphthol,
2,3-dimethylphenol,
2,4-dimethylphenol,
2,6-dimethylphenol,
2,6-di-tert-butylphenol,
2,4-dichlorophenol,
2,4-difluorophenol,
thymol,
3-methyl-4-methylthiophenol,
2-tert-butyl-5-methylphenol,
2,6-bis(hydroxymethyl)-4-methylphenol,
2,3,5-trimethylphenol,
2,6-bis(hydroxymethyl)-4-tert-octylphenol,
6-hydroxy-1,3-benzooxathiol-2-one,
2,4-bis(phenylsulfonyl)phenol,
2,4-bis(phenylsulfonyl)-5-methylphenol,
2,4-bis(4-methylphenylsulfonyl)phenol,
2-phenylphenol, 4-phenylphenol,
2,6-diphenylphenol,
3-benzylbiphenyl-2-ol,
3,5-dibenzylbiphenyl-4-ol,
4-cyano-4'-hydroxybiphenyl,
1-hydroxybenzotriazole,
1-hydroxy-5-methylbenzotriazole,
1-hydroxy-5-chlorobenzotriazole,
1-hydroxy-5-methoxybenzotriazole,
1-hydroxy-4-benzoylaminobenzotriazole,
1-hydroxy-4,5,6,7-tetrachlorobenzotriazole,
1,4-hydroxybenzotriazole,
1-hydroxy-5-nitrobenzotriazole,
1-hydroxy-5-phenylbenzotriazole,
1-hydroxy-5-benzylbenzotriazole,
1-hydroxy-5-ethylbenzotriazole,
1-hydroxy-5-n-octylbenzotriazole,
1-hydroxy-5-n-butylbenzotriazole,
n-butyl 4-hydroxybenzoate,
n-octyl 4-hydroxybenzoate,
4-hydroxybenzoate 2-heptadecafluorooctylethane,
benzyl 4-hydroxybenzoate,
4-hydroxybenzoate-o-methylbenzyl,
4-hydroxybenzoate-m-methylbenzyl,
4-hydroxybenzoate-p-methylbenzyl,
4-hydroxybenzoate-p-ethylbenzyl,
4-hydroxybenzoate-p-propylbenzyl,
4-hydroxybenzoate-p-tert-butylbenzyl,
phenylethyl 4-hydroxybenzoate,
4-hydroxybenzoate-o-methylphenylethyl,
4-hydroxybenzoate-m-methylphenylethyl,
4-hydroxybenzoate-p-methylphenylethyl,
4-hydroxybenzoate-p-ethylphenylethyl,
4-hydroxybenzoate-p-propylphenylethyl, and
4-hydroxybenzoate-p-tert-butylphenylethyl.

Examples of the compound having two phenolic hydroxy groups include
resorcin,
2-methylresorcin,
4-n-hexylresorcin,
4-n-octylresorcin,
4-tert-octylresorcin,
4-benzoylresorcin,
4-nitroresorcin,
methyl β-resorcinol,
benzyl β-resorcinol,
2-chloro-4-pentanoylresorcin,
6-chloro-4-pentanoylresorcin,
2-chloro-4-hexanoyl resorcin,
6-chloro-4-hexanoylresorcin,
2-chloro-4-propanoylresorcin,
6-chloro-4-propanoylresorcin,
2,6-dichloro-4-propanoylresorcin,
6-fluoro-4-propanoylresorcin,
2-chloro-4-phenylacetylresorcin,
4-phenylacetyl-6-chlororesorcin,
2-chloro-4-β-phenylpropanoylresorcin,
6-chloro-4-β-phenylpropanoylresorcin,
2-chloro-4-phenoxyacetylresorcin,
6-chloro-4-phenoxyacetylresorcin,
4-benzoyl-2-chlororesorcin,
6-chloro-4-m-methylbenzoylresorcin, 4-[1',3',4',9'a-tetrahydro-6'-hydroxyspiro(cyclohexane-1,9'-[9H]-xanthene)-4'a-[2H]-yl]-1,3-benzenediol,
hydroquinone,
methyl hydroquinone,
trimethyl hydroquinone,
catechol,
4-tert-butylcatechol,
1,6-dihydroxynaphthalene,
2,7-dihydroxynaphthalene,
1,5-dihydroxynaphthalene,
2,6-dihydroxynaphthalene,
2,4-dihydroxybenzophenone,
2,4-dihydroxy-2'-methylbenzophenone,
2,4-dihydroxy-3'-methylbenzophenone,
2,4-dihydroxy-4'-methylbenzophenone,
2,4-dihydroxy-4'-ethylbenzophenone,
2,4-dihydroxy-4'-n-propylbenzophenone,
2,4-dihydroxy-4'-isopropylbenzophenone,
2,4-dihydroxy-4'-n-butylbenzophenone,
2,4-dihydroxy-4'-isobutylbenzophenone,
2,4-dihydroxy-4'-tert-butylbenzophenone,
2,4-dihydroxy-4'-n-pentylbenzophenone,
2,4-dihydroxy-4'-n-hexylbenzophenone,
2,4-dihydroxy-4'-n-heptylbenzophenone,
2,4-dihydroxy-4'-n-octylbenzophenone,
2,4-dihydroxy-4'-n-decylbenzophenone,
2,4-dihydroxy-2',3'-dimethylbenzophenone,
2,4-dihydroxy-2',4'-dimethylbenzophenone,
2,4-dihydroxy-2',5'-dimethylbenzophenone,
2,4-dihydroxy-2',6'-dimethylbenzophenone,
2,4-dihydroxy-3',4'-dimethylbenzophenone,
2,4-dihydroxy-3',5'-dimethylbenzophenone,
2,4-dihydroxy-2',4',6'-trimethylbenzophenone,
2,4-dihydroxy-2'-methoxybenzophenone,
2,4-dihydroxy-3'-methoxybenzophenone,
2,4-dihydroxy-4'-methoxybenzophenone,
2,4-dihydroxy-2'-ethoxybenzophenone,
2,4-dihydroxy-4'-ethoxybenzophenone,
2,4-dihydroxy-4'-n-propoxybenzophenone,
2,4-dihydroxy-4'-isopropoxybenzophenone,
2,4-dihydroxy-4'-n-butoxybenzophenone,
2,4-dihydroxy-4'-isobutoxybenzophenone,
2,4-dihydroxy-4'-n-pentyloxybenzophenone,
2,4-dihydroxy-4'-n-hexyloxybenzophenone,
2,4-dihydroxy-4'-n-heptyloxybenzophenone,
2,4-dihydroxy-4'-n-octyloxybenzophenone,
2,4-dihydroxy-4'-n-nonyloxybenzophenone,
2,4-dihydroxy-2',3'-dimethoxybenzophenone,
2,4-dihydroxy-2',4'-dimethoxybenzophenone,
2,4-dihydroxy-2',5'-dimethoxybenzophenone,
2,4-dihydroxy-2',6'-dimethoxybenzophenone,
2,4-dihydroxy-3',4'-dimethoxybenzophenone,
2,4-dihydroxy-3',5'-dimethoxybenzophenone,
2,4-dihydroxy-3',4'-diethoxybenzophenone,
2,4-dihydroxy-2',3',4'-trimethoxybenzophenone,
2,4-dihydroxy-2',3',6'-trimethoxybenzophenone,
2,4-dihydroxy-3',4',5'-trimethoxybenzophenone, and
2,4-dihydroxy-3',4',5'-triethoxybenzophenone.

In addition, examples of a bis-type phenol compound include
1,1-bis(4-hydroxyphenyl)ethane,
1,1-bis(4-hydroxyphenyl)propane,
1,1-bis(4-hydroxyphenyl)n-butane,
1,1-bis(4-hydroxyphenyl)n-pentane,
1,1-bis(4-hydroxyphenyl)n-hexane,
1,1-bis(4-hydroxyphenyl)n-heptane,
1,1-bis(4-hydroxyphenyl)n-octane,
1,1-bis(4-hydroxyphenyl)n-nonane,
1,1-bis(4-hydroxyphenyl)n-decane,
1,1-bis(4-hydroxy-3-methylphenyl)decane,
1,1-bis(4-hydroxyphenyl)n-dodecane,
1,1-bis(4-hydroxyphenyl)-2-methylpropane,
1,1-bis(4-hydroxyphenyl)-3-methylbutane,
1,1-bis(4-hydroxyphenyl)-3-methylpentane,
1,1-bis(4-hydroxyphenyl)-2,3-dimethylpentane,
1,1-bis(4-hydroxyphenyl)-2-ethylbutane,
1,1-bis(4-hydroxyphenyl)-2-ethylhexane,
1,1-bis(4-hydroxyphenyl)-3,7-dimethyloctane,
1,1-bis(4-hydroxyphenyl)cyclohexane,
1,1-bis(4-hydroxyphenyl)-3,3,5-trimethylcyclohexane,
1,1-bis(4-hydroxy-3-methyl)cyclohexane,
diphenolic acid,
1-phenyl-1,1-bis(4-hydroxyphenyl)methane,
2,2-bis(4-hydroxyphenyl)propane,
2,2-bis(4-hydroxyphenyl)n-butane,
2,2-bis(4-hydroxyphenyl)n-pentane,
2,2-bis(4-hydroxyphenyl)n-hexane,
2,2-bis(4-hydroxyphenyl)n-heptane,
2,2-bis(4-hydroxyphenyl)n-octane,
2,2-bis(4-hydroxyphenyl)n-nonane,
2,2-bis(4-hydroxyphenyl)n-decane,
2,2-bis(4-hydroxyphenyl)n-dodecane,
2,2-bis(4-hydroxyphenyl)-6,10,14-trimethylpentadecane,
1-phenyl-1,1-bis(4-hydroxyphenyl)ethane,
2,2-bis(4-hydroxyphenyl)methylpropionate,
2,2-bis(4-hydroxyphenyl)butyl propionate,
2,2-bis(4-hydroxy-3-methylphenyl)methylpropionate,
2,2-bis(4-hydroxyphenyl)ethylpropionate,
2,2-bis(4-hydroxyphenyl)-4-methylpentane,
2,2-bis(4-hydroxyphenyl)-4-methylhexane,
2,2-bis(4-hydroxyphenyl)hexafluoropropane,
2,2-bis(3,5-dihydroxymethyl-4-hydroxyphenyl)hexafluoropropane,
2,2-bis(4-hydroxy-3-methylphenyl)propane,
2,2-bis(4-hydroxy-3-methylphenyl)butane,
2,2-bis(4-hydroxy-3-isopropylphenyl)propane,
2,2-bis(3-sec-butylphenyl-4-hydroxy)propane,
2,2-bis(4-hydroxy-3-phenylphenyl)propane,
2,2-bis(3-tert-butyl-4-hydroxyphenyl)propane,
2,2-bis(3-fluoro-4-hydroxyphenyl)propane,
2,2-bis(3,5-dihydroxymethyl-4-hydroxyphenyl)propane,
9,9-bis(4-hydroxy-3-methylphenyl)fluorene,
1,3-bis[2-(4-hydroxyphenyl)-2-propyl]benzene,
1,4-bis[2-(4-hydroxyphenyl)-2-propyl]benzene,
3,3-bis(4-hydroxyphenyl)oxindole,
3,3-bis(4-hydroxy-3-methylphenyl)oxindole,
bis(2-hydroxyphenyl)methane,
bis(2-hydroxy-5-methylphenyl)methane,
bis(2-hydroxy-3-hydroxymethyl-5-methyl)methane,
4,4'-[1,4-phenylene bis(1-methylethylidene)]bis(2-methylphenol),
1,1-bis(4-hydroxy-3-phenylphenyl)cyclohexane,
3,3-ethyleneoxydiphenol,
1,4-bis(4-hydroxybenzoart)-3-methylbenzene,
4,4''-dihydroxy-3''-methyl-p-terphenyl,
4,4''-dihydroxy-3''-isopropyl-p-terphenyl,
2,2-dimethyl-1,3-bis(4-hydroxybenzoyloxy)propane,
2,2'-biphenol,
4,4'''-dihydroxy-p-quaterphenyl,
4,4-dihydroxydiphenyl ether, bis(4-hydroxyphenylthioethyl)ether bis(4-hydroxyphenyl)sulfone,
4-benzyloxy-4'-hydroxydiphenylsulfone,
4-(4-methylbenzyloxy)-4'-hydroxydiphenylsulfone,
4-(4-ethylbenzyloxy)-4'-hydroxydiphenylsulfone, 4-(4-n-propylbenzyloxy)-4'-hydroxydiphenylsulfone,
4-(4-isopropylbenzyloxy)-4'-hydroxydiphenylsulfone,
4-(4-n-butylbenzyloxy)-4'-hydroxydiphenylsulfone,
4-(4-isobutylbenzyloxy)-4'-hydroxydiphenylsulfone,
4-(4-sec-butylbenzyloxy)-4'-hydroxydiphenylsulfone,
4-(4-tert-butylbenzyloxy)-4'-hydroxydiphenylsulfone,
4-(3-methylbenzyloxy)-4'-hydroxydiphenylsulfone,
4-(3-ethylbenzyloxy)-4'-hydroxydiphenylsulfone,
4-(3-n-propylbenzyloxy)-4'-hydroxydiphenylsulfone,
4-(3-isopropylbenzyloxy)-4'-dihydroxyphenyl sulfone,
4-(3-n-butylbenzyloxy)-4'-hydroxydiphenylsulfone,
4-(3-isobutylbenzyloxy)-4'-hydroxydiphenylsulfone,
4-(3-sec-butylbenzyloxy)-4'-hydroxydiphenylsulfone,
4-(3-tert-butylbenzyloxy)-4'-hydroxydiphenylsulfone,
4-(2-methylbenzyloxy)-4'-hydroxydiphenylsulfone,
4-(2-ethylbenzyloxy)-4'-hydroxydiphenylsulfone,
4-(2-n-propylbenzyloxy)-4'-hydroxydiphenylsulfone,
4-(2-isopropylbenzyloxy)-4'-hydroxydiphenylsulfone,
4-(2-n-butylbenzyloxy)-4'-hydroxydiphenylsulfone,
4-(2-isobutylbenzyloxy)-4'-hydroxydiphenylsulfone,
4-(2-sec-butylbenzyloxy)-4'-hydroxydiphenylsulfone,
4-(2-tert-butylbenzyloxy)-4'-hydroxydiphenylsulfone,
2,4'-dihydroxydiphenylsulfone,
3,4'-dihydroxydiphenyl sulfone,
4-hydroxydiphenyl sulfone,
4-methyl-4'-hydroxidiphenyl sulfone,
4-ethyl-4'-hydroxydiphenyl sulfone,
4-n-propyl-4'-hydroxydiphenyl sulfone,
4-isopropyl-4'-hydroxydiphenyl sulfone,
4-chloro-4'-hydroxydiphenyl sulfone,
4-fluoro-4'-hydroxydiphenyl sulfone,
4-chloro-2-methyl-4'-hydroxydiphenyl sulfone,
4-methoxy-4'-hydroxydiphenyl sulfone,
4-ethoxy-4'-hydroxydiphenyl sulfone,
4-n-propoxy-4'-hydroxydiphenyl sulfone,
4-isopropoxy-4'-hydroxydiphenyl sulfone,
4-n-butyloxy-4'-hydroxydiphenyl sulfone,
4-isobutoxy-4'-hydroxydiphenyl sulfone,
4-sec-butoxy-4'-hydroxydiphenyl sulfone,
4-tert-butoxy-4'-hydroxydiphenyl sulfone,
4-n-pentyloxy-4'-hydroxydiphenylsulfone,
4-isopentyloxy-4'-hydroxydiphenyl sulfone,
4-(1-propenyloxy)-4'-hydroxydiphenyl sulfone,
4-(2-propenyloxy)-4'-hydroxydiphenyl sulfone,
4-benzyloxy-4'-hydroxydiphenyl sulfone,
4-(β-phenoxyethoxy)-4'-hydroxydiphenyl sulfone,
4-(β-phenoxypropoxyl)-4'-hydroxydiphenyl sulfone,
bis(2-allyl-4-hydroxydiphenyl)sulfone,
bis[4-hydroxy-3-(2-propenyl)phenyl]sulfone,
bis(3,5-dibromo-4-hydroxyphenyl)sulfone,
bis(3,5-dichloro-4-hydroxyphenyl)sulfone,
bis(3-phenyl-4-hydroxyphenyl)sulfone,
bis(4-hydroxy-3-n-propylphenyl)sulfone,
bis(4-hydroxy-3-methylphenyl)sulfone,
3,4-dihydroxydiphenyl sulfone,
3',4'-dihydroxy-4-methyldiphenylsulfone,
3,4,4'-trihydroxydiphenyl sulfone,
bis(3,4-dihydroxyphenyl)sulfone,
2,3,4-trihydroxydiphenyl sulfone,
4-isopropoxy-4'-hydroxydiphenyl sulfone,
4-n-propoxy-4'-hydroxydiphenyl sulfone,
4-allyloxy-4'-hydroxydiphenyl sulfone,
4-benzyloxy-4'-hydroxydiphenyl sulfone,
4-(2-propenyloxy)-4'-hydroxydiphenyl sulfone,
3-benzyl-4-benzyloxy-4'-hydroxydiphenyl sulfone,
3-phenethyl-4-phenethyloxy-4'-hydroxydiphenyl sulfone,
3-methylbenzyl-4-methylbenzyloxy-4'-hydroxydiphenylsulfone,
4-benzyloxy-3'-benzyl-4'-hydroxydiphenylsulfone,
4-phenethyloxy-3'-phenethyl-4'-hydroxydiphenylsulfone,
4-methylbenzyloxy-3'-methylbenzyl-4'-hydroxydiphenylsulfone,
α,α'-bis{4-(p-hydroxyphenyl sulfone)phenoxy}-p-xylene,
4,4'-{oxybis(ethylene oxide-p-phenylene sulfonyl)}diphenol
bis(4-hydroxyphenyl)sulfide,
bis(4-hydroxy-3-methylphenyl)sulfide,
bis(3,5-dimethyl-4-hydroxyphenyl)sulfide,
bis(3-ethyl-4-hydroxyphenyl)sulfide,
bis(3,5-diethyl-4-hydroxyphenyl)sulfide,
bis(4-hydroxy-3-n-propylphenyl)sulfide,
bis(3,5-di-n-propyl-4-hydroxyphenyl)sulfide,
bis(3-tert-butyl-4-hydroxyphenyl)sulfide,
bis(3,5-di-tert-butyl-4-hydroxyphenyl)sulfide,
bis(4-hydroxy-3-n-pentylphenyl)sulfide,
bis(3-n-hexyl-4-hydroxyphenyl)suifide,
bis(3-n-heptyl-4-hydroxyphenyl)sulfide,
bis(5-tert-octyl-2-hydroxyphenyl)sulfide,
bis(2-hydroxy-3-tert-octylphenyl)sulfide,
bis(2-hydroxy-5-n-octyl-phenyl)sulfide,
bis(5-chloro-2-hydroxyphenyl)sulfide,
bis(3-cyclohexyl-4-hydroxyphenyl)sulfide,
bis(4-hydroxyphenylthioethoxy)methane,
1,5-(4-hydroxyphenylthio)-3-oxypentane, and
1,8-bis(4-hydroxyphenylthio)-3,6-dioxaoctane.

Examples of the compound having three phenolic hydroxy groups include pyrogallol, phloroglucinol, phloroglucinolcarboxylic acid, gallic acid, octyl gallate, and dodecyl gallate.

In addition, examples of a tris-type phenol compound include
4,4',4"-methylidine trisphenol,
4,4',4"-methylidine tris(2-methylphenol),
4,4'-[(2-hydroxyphenyl)methylene]bis(2,3,5-trimethylphenol),
4,4'-[(4-hydroxyphenyl)methylene]bis(2-methylphenol),
4,4'-[(4-hydroxyphenyl)methylene]bis(2,6-dimethylphenol),
4,4'-[(4-hydroxy-3-methoxyphenyl)methylene]bisphenol,
4,4'-[(4-hydroxyphenyl)methylene]bis(2-cyclohexyl-5-methylphenol),
4,4',4"-ethylidine trisphenol,
4,4',4"-ethyridinetris(2-methylphenol),
4,4'-[(2-hydroxyphenyl)methylene]bis(2-cyclohexyl-5-methylphenol),
2,6-bis[(2-hydroxy-5-methylphenyl)methyl]-4-methylphenol,
2,4-bis[(2-hydroxy-5-methylphenyl)methyl]-6-cyclohexylphenol,
4,4'-[1-{4-[1-(4-hydroxyphenyl)-1-methylethyl]phenyl}methylidene]bisphenol,
4,4'-[1-{4-[1-(4-hydroxyphenyl)-1-methylethyl]phenyl}ethylidene]bisphenol,
4,4'-[1-{4-[1-(4-hydroxyphenyl)-1-methylethyl]phenyl}propylidene]bisphenol,
4,4'-[1-{4-[1-(4-hydroxyphenyl)-1-methylethyl]phenyl}butylidene]bisphenol,
4,4'-[1-{4-[1-(4-hydroxyphenyl)-1-methylethyl]phenyl}pentylidene]bisphenol,
4,4'-[1-{4-[1-(4-hydroxyphenyl)-1-methylethyl]phenyl}hexylidene]bisphenol,
4,4'-[1-{4-[1-(4-hydroxyphenyl)-1-methylethyl]phenyl}heptylidene]bisphenol, 4,4'-[1-{4-[1-(4-hydroxyphenyl)-1-methylethyl]phenyl}isobutylidene]bisphenol,
4,4'-[1-{4-[1-(4-hydroxyphenyl)-1-methylethyl]phenyl}neopentylidene]bisphenol,
2,2'-[1-{4-[1-(2-hydroxyphenyl)-1-methylethyl]phenyl}ethylidene]bisphenol,
3,3'-[1-{4-[1-(3-hydroxyphenyl)-1-methylethyl]phenyl}ethylidene]bisphenol,
4,4'-[1-{4-[1-(3-fluoro-4-hydroxyphenyl)-1-methylethyl]phenyl}ethylidene]bis(2-fluorophenol),
4,4'-[1-{4-[1-(3-chloro-4-hydroxyphenyl)-1-methylethyl]phenyl}ethylidene]bis(2-chlorophenol),
4,4'-[1-{4-[1-(3-bromo-4-hydroxyphenyl)-1-methylethyl]phenyl}ethylidene]bis(2-bromophenol),
4,4'-[1-{4-[1-(4-hydroxy-3-methylphenyl)-1-methylethyl]phenyl}ethylidene]bis(2-methylphenol),
4,4'-[1-{4-[1-(3-ethyl-4-hydroxyphenyl)-1-methylethyl]phenyl}ethylidene]bis(2-ethylphenol),
4,4'-[1-{4-[1-(3-tert-butyl-4-hydroxyphenyl)-1-methylethyl]phenyl}ethylidene]bis(2-tert-butylphenol),
4,4'-[1-{4-[1-(4-hydroxy-3-trifluoromethylphenyl)-1-methylethyl]phenyl}etylidene]bis(2-trifluoromethylphenol),
1,1-bis(4-hydroxyphenyl)-4-(4-hydroxy-α-ethyl)benzylcyclohexane,
4,4'-[(3-ethoxy-4-hydroxycyphenyl)methylene]bisphenol,
4,4'-[(3-hydroxyphenyl)methylene]bis(2,6-dimethylphenol),
2,2'-[(4-hydroxyphenyl)methylene]bis(3,5-dimethylphenol),
4,4'-[(4-hydroxy-3-methoxyphenyl)methylene]bis(2,6-dimethylphenol),
2,2'-[(2-hydroxyphenyl)methylene]bis(3,5,6-trimethylphenol),
4,4'-[(3-hydroxyphenyl)methylene]bis(2,3,6-trimethylphenol),
4,4'-[(4-hydroxyphenyl)methylene]bis(2,3,6-trimethylphenol),
4,4'-[(3-hydroxyphenyl)methylene]bis(2-cyclohexyl-5-methylphenol),
4,4'-[(4-hydroxyphenyl-3-methoxy)methylene]bis(2-cyclohexyl-5-methylphenol),
1,1-bis(4-hydroxyphenyl)-4-hydroxyphenylcyclohexane,
4,4'-[3-(5-cyclohexyl-4-hydroxy-2-methylphenyl)-3-phenylpropylidene]bis(2-cyclohexyl-5-methylphenol),
4,4'-[(2-hydroxyphenyl)methylene]bis(2-methylphenol),
2,4',4''-methylidine trisphenol,
4,4'-[(2-hydroxyphenyl)methylene]bis(3-methylphenol),
4,4'-[4-(4-hydroxyphenyl)-sec-butylidene]bis(4-hydroxyphenol),
2,2'-[(3-hydroxyphenyl)methylene]bis(3,5-dimethylphenol),
4,4'-[(2-hydroxy-3-methoxyphenyl)methylene]bis(2,5-dimethylphenol),
4,4'-[(2-hydroxy-3-methoxyphenyl)methylene]bis(2,6-dimethylphenol),
2,2'-[(2-hydroxy-3-methoxyphenyl)methylene]bis(3,5-dimethylphenol),
2,2'-[(3-hydroxy-4-methoxyphenyl)methylene]bis(3,5-dimethylphenol),
2,2'-[(4-hydroxy-3-methoxyphenyl)methylene]bis(3,5-dimethylphenol),
4,4'-[(2-hydroxyphenyl)methylene]bis(2-isopropylphenol),
4,4'-[(3-hydroxyphenyl)methylene]bis(2-isopropylphenol),
4,4'-[(4-hydroxyphenyl)methylene]bis(2-isopropylphenol),
2,2'-[(3-hydroxyphenyl)methylene]bis(3,5,6-trimethylphenol),
2,2'-[(4-hydroxyphenyl)methylene]bis(3,5,6-trimethylphenol),
2,2'-[(4-3-ethoxy-4-hydroxyphenyl)methylene]bis(3,5-dimethylphenol),
1,1-bis(4-hydroxy-3-methylphenyl)-4-(4-hydroxyphenyl)cyclohexane,
4,4'-[(2-hydroxy-3-methoxyphenyl)methylene]bis(2-isopropylphenol),
4,4'-[(3-hydroxy-4-methoxyphenyl)methylene]bis(2-isopropylphenol),
4,4'-[(4-hydroxy-3-methoxyphenyl)methylene]bis(2-isopropylphenol),
2,2'-[(2-hydroxy-3-methoxyphenyl)methylene]bis(3,5,6-trimethylphenol,
2,2'-[(3-hydroxy-4-methoxyphenyl)methylene]bis(3,5,6-trimethylphenol),
2,2'-[(4-hydroxy-3-methoxyphenyl)methylene]bis(3,5,6-trimethylphenol),
4,4'-[(3-ethoxy-4-hydroxyphenyl)methylene]bis(2-isopropylphenol),
2,2'-[(3-ethoxy-4-hydroxyphenyl)methylene]bis(3,5,6-trimethylphenol),
4,4'-[(3-ethoxy-4-hydroxyphenyl)methylene]bis(2,3,6-trimethylphenol),
1,1-bis(3,5-dimethyl-4-hydroxyphenyl)-4-(4-hydroxyphenyl)cyclohexane,
4,4'-[(4-hydroxy-3-methoxyphenyl)methylene]bis(2-tert-butyl-5-methylphenol),
4,4'-[(2-hydroxyphenyl)methylene]bis(2-cyclohexylphenol),
4,4'-[(3-hydroxyphenyl)methylene]bis(2-cyclohexylphenol),
4,4'-[(3-ethoxy-4-hydroxyphenyl)methylene]bis(2-tert-butyl-6-methylphenol),
4,4'-[(3-methoxy-2-hydroxyphenyl)methylene]bis(2-cyclohexylphenol),
4,4'-[(3-hydroxy-4-methoxyphenyl)methylene]bis(2-cyclohexylphenol),
4,4'-[1-{4-[1-(3-fluoro-4-hydroxylophenyl)-1-methylethyl]phenyl}ethylidene]bis(2-tert-butylphenol),
4,4'-[1-{4-[1-(3,5-dimethyl-4-hydroxyphenyl)-1-methylethyl]phenyl}ethylidene]bis(2,6-dimethylphenol),
4,4'-[(3-ethoxy-4-hydroxyphenyl)methylene]bis(2-cyclohexyl-5-methylphenol),
4,4'-[(3-cyclohexyl-4-hydroxyphenyl)ethylidene]bis(2-cyclohexylphenol),
4,4'-[(5-cyclohexyl-4-hydroxy-2-methoxyphenyl)ethylidene]bis(2-cyclohexyl-5-methylphenol),
4,4'-[1-{4-[1-(3-cyclohexyl-4-hydroxyphenyl)-1-methylethyl]phenyl}ethylidene]bis(2-cyclohexylphenol),
4,4'-[1-{4-[1-(3-fluoro-4-hydroxyphenyl)-1-methylethyl]phenyl}ethylidene]bisphenol,
4,4'-[1-{4-[1-(3-fluoro-4-hydroxyphenyl)-1-methylethyl]phenyl}ethylidene]bis(2-methylphenol),
4,4'-[1-{4-[1-(3-fluoro-4-hydroxyphenyl)-1-methylethyl]phenyl}ethylidene]bis(2,6-dimethylphenol),
2,6-bis[(5-fluoro-2-hydroxyphenyl)methyl]-4-methylphenol,
2,6-bis[(3,5-dimethyl-4-hydroxyphenyl)methyl]-4-methylphenol,
2,6-bis[(4-hydroxyphenyl)methyl]-4-methylphenol,
2,6-bis[(4-hydroxyphenyl)methyl]-4-ethylphenol,
2,4-bis[(4-hydroxy-3-methylphenyl)methyl]-6-methylphenol,
2,6-bis[(4-hydroxy-3-methylphenyl)methyl]-4-methylphenol,
2,6-bis[(4-hydroxy-3-methylphenyl)methyl]-4-ethylphenol, 2,6-bis[(2-hydroxy-5-methylphenyl)methyl]-4-ethylphenol,
2,6-bis[(3,5-dimethyl-2-hydroxyphenyl)methyl]-4-methylphenol,
2,6-bis[(2,4-dimethyl-6-hydroxyphenyl)methyl]-4-methylphenol,
2,4-bis[(4-hydroxyphenyl)methyl]-6-cyclohexylphenol,
2,6-bis[(2,5-dimethyl-4-hydroxyphenyl)methyl]-3,4-dimethylphenol,
2,6-bis[(2,5-dimethyl-4-hydroxyphenyl)methyl]-4-ethylphenol,
2,6-bis[(4-hydroxy-2,3,6-trimethylphenyl)methyl]-4-methylphenol,
2,4-bis[(4-hydroxy-3-methylphenyl)methyl]-6-cyclohexylphenol,
2,6-bis[(4-hydroxy-3-methylphenyl)methyl]-4-cyclohexylphenol,
2,6-bis[(2-hydroxy-5-methylphenyl)methyl]-4-cyclohexylphenol,
2,6-bis[(4-hydroxy-2,3,5-trimethylphenyl)methyl]-4-ethylphenol,
2,4-bis[(2,5-dimethyl-4-hydroxyphenyl)methyl]-6-cyclohexylphenol,
4,4',4"-methylidine tris(2,6-dimethylphenol),
α-(4-hydroxy-3-methylphenyl)-α,α'-bis(4-hydroxyphenyl)-1-ethyl-4-isopropylbenzene,
-(4-hydroxy-3-methylphenyl)-α,α-bis(4-hydroxyphenyl)-1-ethyl-4α'-isopropylbenzene,
α,α-bis(4-hydroxy-3-methylphenyl)-α'-(4-hydroxyphenyl)-1-ethyl-4-isopropylbenzene,
α,α'-bis(4-hydroxy-3-methylphenyl)-α-(4-hydroxyphenyl)-1-ethyl-4-isopropylbenzene,
1,1-bis(4-hydroxyphenyl)-4-[1-(4-hydroxyphenyl)-1-methylpropyl]cyclohexane,
2,6-bis[(3,5-dimethyl-4-hydroxyphenyl)methyl]-4-ethylphenol,
1,1'-bis(4-hydroxyphenyl)-4-[1-(4-hydroxyphenyl)propyl]cyclohexane,
1,1'-bis(4-hydroxy-3-methylphenyl)-4-[1-(4-hydroxyphenyl)propyl]cyclohexane,
1,1'-bis(3,5-dimethyl-4-hydroxyphenyl)-4-[1-(4-hydroxyphenyl)propyl]cyclohexane,
1-(4-hydroxyphenyl)-1-[4,4-bis(4-hydroxyphenyl)cyclohexyl]-4-isopropylcyclohexane,
4,4'-[3-(2,5-dimethyl-4-hydroxyphenyl)butylene]bis(2,5-dimethylphenol),
1,3,5-tri(4-hydroxy-3-phenylphenyl)adamantane,
1,3,5-tri(3-cyclohexyl-4-hydroxyphenyl)adamantane,
2,4-bis[(3,5-dimethyl-4-hydroxyphenyl)methyl]-6-cyclohexylphenol,
2,6-bis[(2,5-dimethyl-4-hydroxyphenyl)methyl]-4-cyclohexylphenol,
2,4-bis[(3-cyclohexyl-4-hydroxyphenyl)methyl]-6-methylphenol,
2,4-bis[(4-hydroxy-2,3,5-trimethylphenyl)methyl]-6-cyclohexylphenol,
2,6-bis[(5-fluoro-2-hydroxyphenyl)methyl]-4-fluorophenol,
2,6-bis[(3-fluoro-4-hydroxyphenyl)methyl]-4-fluorophenol,
2,4-bis[(3-fluoro-4-hydroxyphenyl)methyl]-6-methylphenol,
4,4'-[3-(5-cyclohexyl-4-hydroxy-2-methylphenyl)-3-biphenylpropylidene]bis(5-cyclohexyl-2-methylphenol),
4,4'-[3-(2,5-dimethyl-4-hydroxyphenyl)-3-phenylpropylidene]bis(2,5-dimethylphenol),
2,4-bis[(2,5-dimethyl-4-hydroxyphenyl)methyl]-6-methylphenol,
1,1,2-tris(4-hydroxyphenyl)ethane,
1,1,3-tris(4-hydroxyphenyl)propane,
1,1,4-tris(4-hydroxyphenyl)butane,
1,2,2-tris(4-hydroxyphenyl)propane,
1,2,2-tris(4-hydroxyphenyl)butane,
1,2,2-tris(4-hydroxyphenyl)pentane,
1,2,2-tris(4-hydroxyphenyl)hexane,
1,2,2-tris(4-hydroxyphenyl)heptane,
1,2,2-tris(4-hydroxyphenyl)octane,
1,2,2-tris(4-hydroxyphenyl)-3-methylbutane 1,2,2-tris(4-hydroxyphenyl)-3,3-dimethylbutane,
1,2,2-tris(4-hydroxyphenyl)-4,4-dimethylpentane,
1,3,3-tris(4-hydroxyphenyl)butane,
1,3,3-tris(4-hydroxyphenyl)pentane,
1,3,3-tris(4-hydroxyphenyl)hexane,
1,3,3-tris(4-hydroxyphenyl)heptane,
1,3,3-tris(4-hydroxyphenyl)octane,
1,3,3-tris(4-hydroxyphenyl)nonane,
1,4,4-tris(4-hydroxyphenyl)pentane,
1,4,4-tris(4-hydroxyphenyl)hexane,
1,4,4-tris(4-hydroxyphenyl)heptane,
1,4,4-tris(4-hydroxyphenyl)octane,
1,4,4-tris(4-hydroxyphenyl)nonane,
1,4,4-tris(4-hydroxyphenyl)decane,
1,2,2-tis(2-hydroxyphenyl)propane,
1,1,2-tris(3-hydroxyphenyl)propane,
1-(4-hdroxyphenyl)-2,2-bis(2-hydroxyphenyl)propane,
1,2,2-tris(3-fluoro-4-hydroxyphenyl)propane,
1,2,2-tris(3-chloro-4-hydroxyphenyl)propane,
1,2,2-tris(3-bromo-4-hydroxyphenyl)propane,
2,2-bis(3-ethyl-4-hydroxyphenyl)-1-(4-hydroxyphenyl)propane,
2,2-bis(3-tert-butyl-4-hydroxyphenyl)-1-(4-hydroxyphenyl)propane,
2,2-bis(2-hydroxy-3-biphenylyl)-1-(4-hydroxyphenyl)propane,
2,2-bis(3-trifluoromethyl-4-hydroxyphenyl)-1-(4-hydroxyphenyl)propane,
2-(3-methyl-4-hydroxyphenyl)-1,2-bis(4-hydroxyphenyl)propane,
1-(3-methyl-4-hydroxyphenyl)-2,2-bis(4-hydroxyphenyl)propane,
3-(3-methyl-4-hydroxyphenyl)-1,3-bis(4-hydroxyphenyl)butane,
1-(3-methyl-4-hydroxyphenyl)-3,3-bis(4-hydroxyphenyl)butane,
4-(3-methyl-4-hydroxyphenyl)-1,4-bis(4-hydroxyphenyl)pentane,
1-(3-methyl-4-hydroxyphenyl)-4,4-bis(4-hydroxyphenyl)pentane,
1,2-bis(3-methyl-4-hydroxyphenyl)-2-(4-hydroxyphenyl)propane,
3,3-bis(3-methyl-4-hydroxyphenyl)-1-(4-hydroxyphenyl)butane,
1,3-bis(3-methyl-4-hydroxyphenyl)-3-(4-hydroxyphenyl)butane,
4,4-bis(3-methyl-4-hydroxyphenyl)-1-(4-hydroxyphenyl)pentane,
1,4-bis(3-methyl-4-hydroxyphenyl)-4-(4-hydroxyphenyl)pentane,
1,1,2-tris(3-methyl-4-hydroxyphenyl)ethane,
1,2,2-tris(3-methyl-4-hydroxyphenyl)propane,
1,1,3-tris(3-methyl-4-hydroxyphenyl)propane,
1,3,3-tris(3-methyl-4-hydroxyphenyl)butane,
1,1,4-tris(3-methyl-4-hydroxyphenyl)butane,
1,4,4-tris(3-methyl-4-hydroxyphenyl)pentane, and
4,4'-[4-(4-hydroxyphenyl)-sec-butylidene]bis(2-methylphenol).

Examples of the compound having four or more phenolic hydroxy groups include phenolic hydroxy groups,
bis[2-hydroxy-3-(2-hydroxy-5-methylbenzyl)-5-methylphenyl]methane,
4,6-bis[(4-hydroxyphenyl)methyl]-1,3-benzenediol,
4,4'-[(3,4-dihydroxyphenyl)methylene]bis(2,6-dimethylphenol),
4,4'-[(3,4-dihydroxyphenyl)methylene]bis(2-cyclohexyl-5-methylphenol),
4,4'-[(3,4-dihydroxyphenyl)methylene]bis(2-methylphenol),
4,4'-[(3,4-dihydroxyphenyl)methylene]bis(2,3,6-trimethylphenol),
1,1,2,2-tetrakis(4-hydroxyphenyl)ethane,
1,1,2,2-tetrakis(4-hydroxy-3-methylphenyl)ethane,
1,1,2,2-tetrakis(3,5-dimethyl-4-hydroxyphenyl)ethane,
1,1,4,4-tetrakis(3,5-dimethyl-4-hydroxyphenyl)benzene,
2,2'-bis[4,4-(4-hydroxy-3-methylphenyl)cyclohexyl]propane,
2,2'-[(3,4-dihydroxyphenyl)methylene]bis(3,5-dimethylphenol),
3,6-bis[(3,5-dimethyl-4-hydroxyphenyl)methyl]catechol,
4,6-bis[(3,5-dimethyl-4-hydroxyphenyl)methyl]-1,3-benzenediol,
2,2'-[(3,4-dihydroxyphenyl)methylene]bis(3,5,6-trimethylphenol),
4,4'-[(3,4-dihydroxyphenyl)methylene]bis(2-cyclohexylphenol),
bis[3-(2-hydroxybenzyl)-4-hydroxy-5-methylphenyl]methane,
bis[3-(3-hydroxybenzyl)-4-hydroxy-5-methylphenyl]methane,
bis[3-(4-hydroxybenzyl)-4-hydroxy-5-methylphenyl]methane,
bis[3-(2-hydroxybenzyl)-2-hydroxy-5-methylphenyl]methane,
bis[3-(2-hydroxybenzyl)-3-hydroxy-5-methylphenyl]methane,
bis[3-(2-hydroxybenzyl)-4-hydroxy-5-methylphenyl]methane,
bis[3-(3-hydroxy-2-methylbenzyl)-2-hydroxy-5-methylphenyl]methane,
bis[3-(4-hydroxy-3-methylbenzyl)-2-hydroxy-5-methylphenyl]methane,
bis[3-(3-hydroxy-4-methylbenzyl)-2-hydroxy-5-methylphenyl]methane,
bis[3-(2-hydroxy-3-methylbenzyl)-2-hydroxy-5-methylphenyl]methane,
α,α',α",α'"-tetraxis(4-hydroxyphenyl)benzene,
bis[3-(3,6-dimethyl-2-hydroxybenzyl)-2-hydroxy-5-methylphenyl]methane,
[3-(3,6-dimethyl-2-hydroxybenzyl)-2-hydroxy-5-methylphenyl][3-(2,5-dimethyl-4-hydroxybenzyl)-2-hydroxy-5-methylphenyl]methane,
bis[3-(2,5-dimethyl-4-hydroxybenzyl)-2-hydroxy-5-methylphenyl]methane,
bis[3-(3,5-dimethyl-4-hydroxybenzyl)-2-hydroxy-5-methylphenyl]methane,
bis[3-(2-hydroxy-3,4,6-trimethylbenzyl)-2-hydroxy-5-methylphenyl]methane,
bis[2-hydroxy-3-(4-hydroxy-2,3,5-trimethylbenzyl)-5-methylphenyl]methane,
4,4',4",4'"-tetrakis(4-hydroxyphenyl)-1,1'-bicyclohexyl,
2,2'-bis[4,4-bis(4-hydroxyphenyl)cyclohexyl]propane,
4,4',4",4'"-tetrakis(4-hydroxy-3-methylphenyl)-1,1'-bicyclohexyl,
bis[3-(5-cyclohexyl-4-hydroxy-2-methylbenzyl)-4-hydroxy-5-methylphenyl]methane,
4,4',4",4'"-tetrakis(3,5-dimethyl-4-hydroxyphenyl)-1,1'-bicyclohexyl,
1,1-bis[3-(2-hydroxy-5-methylbenzyl)-5-cyclohexyl-4-hydroxyphenyl]cyclohexane,
1,1-bis[3-(3,5-dimethyl-4-hydroxybenzyl)-5-cyclohexyl-4-hydroxyphenyl]cyclohexane,
1,1-bis[3-(5-cyclohexyl-4-hydroxy-2-methylbenzyl)-5-cyclohexyl-4-hydroxyphenyl]cyclohexane,
4,6-bis[α-methyl-(4-hydroxyphenyl)benzyl-1,3-benzenediol,
2,2-bis[3-(4-hydroxy-3-methylbenzyl)-4-hydroxy-5-methylphenyl]propane,
2,6-bis[(3,5-dimethyl-4-hydroxyphenyl)benzyl]-4-α-methyl-(3,5-dimethyl-4-hydroxyphenyl)benzyl]phenol,
4,4',4",4'"-tetrakis(4-hydroxy-3-isopropylphenyl)-1,1'-bicyclohexyl,
4,4'-bis[(3,4-dihydroxyphenyl)methylene]bis(2-isopropylphenol)
2,4,6-tris(4-hydroxybenzyl)-1,3-benzenediol,
4,6-bis(3,5-dimethyl-4-hydroxybenzyl)pyrogallol,
3,3'-[(2-hydroxyphenyl)methylene]bis(5-methylcatechol),
2,6-bis(2,4-dihydroxybenzyl)-4-ethylphenol,
2,4-bis(2,4-dihydroxybenzyl)-6-cyclohexylphenol,
2,6-bis(5-tert-butyl-2,3-dihydroxybenzyl)-4-methylphenol,
2,4,6-tris(3,5-dimethyl-4-hydroxybenzyl)resorcin,
2,4,6-tris(3,5-dimethyl-2-hydroxybenzyl)resorcin,
2,6-bis(2,4-dihydroxybenzyl)-3,4-dimethylphenol,
2,6-bis[3-(2-hydroxy-5-methylbenzyl)-2,5-dimethyl-4-hydroxybenzyl]-3,4-dimethylphenol,
4,6-bis(α-methyl-4-hydroxybenzyl)pyrogallol,
4,4'-[1-{4-[1-(3,5-bis(4-hydroxybenzyl)-4-hydroxyphenyl)-1-methylethyl]phenyl}etylidene]bis[2,6-bis(4-hydroxybenzyl)phenol],
4,4'-[1-{4-[1-(3,5-bis(4-hydroxy-3-methylbenzyl)-4-hydroxyphenyl)-1-methylethyl]phenyl}ethylidene]bis[2,6-bis(4-hydroxy-3-methylbenzyl)phenol],
4,4'-[1-{4-[1-(3,5-bis(3,5-dimethyl-4-hydroxybenzyl)-4-hydroxyphenyl)-1-methylethyl]phenyl}ethylidene]bis[2,6-bis(3,5-dimethyl-4-hydroxybenzyl)phenol],
4,4'-[1-{4-[1-(3,5-bis(4-hydroxy-2,3,6-trimethylbenzyl)-4-hydroxyphenyl)-1-methylethyl]phenyl}ethylidene]bis[2,6-bis(4-hydroxy-2,3,6-trimethylbenzyl)phenol],
bis[5-(2,4-dihydroxybenzyl)-4-hydroxy-3-methylphenyl]methane,
bis[3-(2,4-dihydroxybenzyl)-2,5-dimethyl-4-hydroxyphenyl]methane,
bis[3-(2,4-dihydroxy-3-methylbenzyl)-2,5-dimethyl-4-hydroxyphenyl]methane,
bis[5-(4-hydroxybenzyl)-2,3,4-trihydroxyphenyl]methane,
1,1-bis[5-(4-hydroxybenzoyl)-2,3,4-trihydroxyphenyl]ethane,
3,3',5,5'-tetrakis(4-hydroxybenzyl)-4,4'-dihydroxybiphenyl,
3,3',5,5'-tetrakis(4-hydroxy-3-methylbenzyl)-4,4'-dihydroxybiphenyl,
3,3',5,5'-tetrakis(2-hydroxy-5-methylbenzyl)-4,4'-dihydroxybiphenyl,
3,3',5,5'-tetrakis(3,5-dimethyl-4-hydroxybenzyl)-4,4'-dihydroxybiphenyl,
bis[3-(α,α-bis(4-hydroxy-3-methylphenyl)methyl-4-hydroxyphenyl]methane,
bis[3,5-bis(2-hydroxy-5-methylbenzyl)-4-hydroxyphenyl]methane,
4,4',4"-ethyridinetris{[2-(2-hydroxy-5-methyl)benzyl]-6-methylphenol}, 2,2-bis[3,5-bis(2-hydroxy-5-methylphenylmethyl)phenyl]propane,
bis[3-(α,α-bis(2,5-dimethyl-4-hydroxyphenyl)methyl-4-hydroxyphenyl]methane,
bis[5-(3,5-dimethyl-4-hydroxybenzyl)-2,3,4-trihydroxyphenyl]methane,
bis[3-(2,3,4-trihydroxybenzyl)-2,5-dimethyl-4-hydroxyphenyl]methane,
1,1-bis[3-(2,3,4-trihydroxybenzyl)-5-cyclohexyl-4-hydroxyphenyl]cyclohexane,
1,8,15,22-tetranonyl-3,5,10,12,17,19,24,26-octahydroxy[1,1,1,1]-metacyclophane,
4,4'-[1-{4-[1-(3,5-bis(4-hydroxy-2-methylbenzyl)-4-hydroxyphenyl)-1-methylethyl]phenyl}ethylidene]bis[2,6-bis(4-hydroxy-2-methylbenzyl)phenol],
4,4'-[1-{4-[1-(3,5-bis(2-hydroxy-5-methylbenzyl)-4-hydroxyphenyl)-1-methylethyl]phenyl}ethylidene]bis[2,6-bis(2-hydroxy-5-methylbenzyl)phenol],
4,4'-[1-{4-[1-(3,5-bis(3-ethyl-4-hydroxybenzyl)-4-hydroxyphenyl)-1-methylethyl]phenyl}ethylidene]bis[2,6-bis(3-ethyl-4-hydroxybenzyl)phenol],
4,4'-[1-{4-[1-(3,5-bis(3,5-dimethyl-2-hydroxyphenyl)-4-hydroxyphenyl)-1-methylethyl]phenyl}ethylidene]bis[2,6-bis(3,5-dimethyl-2-hydroxyphenyl)phenol],
4,4'-[1-{4-[1-(3,5-bis(4-hydroxy-3-isopropylphenyl)-4-hydroxyphenyl)-1-methylethyl]phenyl}ethylidene]bis[2,6-bis(4-hydroxy-3-isopropylphenyl)phenol],
bis[3-(α,α-bis(3,5-dimethyl-4-hydroxyphenyl)methyl-4-hydroxyphenyl]methane,
bis[3-(α,α-bis(5-cyclohexyl-4-hydroxy-2-methylphenyl)methyl-4-hydroxyphenyl]methane,
4,4'-[4-hydroxy-3,5-bis(2-hydroxybenzyl)methylene]bis[2,6-bis(2-hydroxybenzyl)]phenol,
4,4'-[4-hydroxy-3,5-bis(4-hydroxybenzyl)methylene]bis[2,6-bis(4-hydroxybenzyl)]phenol,
4,4',4''-ethylidinetris[2,6-bis(2-hydroxybenzyl)phenol],
4,4',4''-ethylidinetris[2,6-bis(4-hydroxybenzyl)phenol],
2,2-bis[3,5-bis(4-hydroxy-3-methylbenzyl)-4-hydroxyphenyl]propane,
1,8,15,22-tetraethyl-3,5,10,12,17,19,24,26-octahydroxy[1,1,1,1]-metacyclophane,
α,α',α'',α'''-tetrakis(3,5-dimethyl-4-hydroxyphenyl)-1,4-dimethylbenzene,
4,4'-[1-{4-[1-(3,5-bis(2-hydroxy-5-isopropylphenyl)-4-hydroxyphenyl)-1-methylethyl]phenyl}ethylidene]bis[2,6-bis(2-hydroxy-5-isopropylphenyl)phenol],
4,4'-[1-{4-[1-(3,5-bis(4-hydroxy-2,3,5-trimethylphenyl)-4-hydroxyphenyl)-1-methylethyl]phenyl}ethylidene]bis[2,6-bis(4-hydroxy-2,3,5-trimethylphenyl)phenol],
4,4'-[1-{4-[1-(3,5-bis(3-sec-butyl-4-hydroxyphenyl)-4-hydroxyphenyl)-1-methylethyl]phenyl}ethylidene]bis[2,6-bis(3-sec-butyl-4-hydroxyphenyl)phenol],
4,4'-[1-{4-[1-(3,5-bis(3-tert-butyl-4-hydroxyphenyl)-4-hydroxyphenyl)-1-methylethyl]phenyl}ethylidene]bis[2,6-bis(3-tert-butyl-4-hydroxyphenyl)phenol],
2,6-bis{[3-(2,4-dihydroxybenzyl)-2,5-dimethyl-4-hydroxy]benzyl}-4-methylphenol,
1,1-bis[5-(2,4-dihydroxybenzyl)-3-cyclohexyl-4-hydroxyphenyl]cyclohexane,
1,1-bis[5-(2,3,4-trihydroxybenzyl)-3-cyclohexyl-4-hydroxyphenyl]cyclohexane, and
2,2-bis[4,4',4'',4'''-tetrakis(3,5-dihydroxymethyl-4-hydroxyphenyl)cyclohexyl]propane.

Examples of the carboxylic acid and the derivative thereof include
3,5-di(α-methylbenzyl)salicylic acid,
4-(2-p-methoxyphenyloxyethoxy)salicylic acid,
4-hydroxyphenylbenzoic acid,
p-chlorobenzoic acid,
4-[2-(p-methoxyphenoxy)ethyloxy]salicylic acid,
4-[3-(p-tolylsulfonyl)propyloxy]salicylic acid,
5-[p-(2-p-methoxyphenoxyethoxy)cumyl]salicylic acid,
4-octyloxycarbonylaminosalicylic acid,
3,5-distyrene salicylic acid,
N-(p-toluenesulfonyl)-glycine,
N-(p-toluenesulfonyl)-alanine,
N-(p-toluenesulfonyl)-β-alanine,
N-phenylaminocarbonyl-glycine,
N-phenylaminocarbonyl-valine,
N-(m-tolylaminocarbonyl)-phenylalanine,
N-(m-tolylaminocarbonyl)-cysteine-S-benzyl,
N-(m-tolylaminocarbonyl)-methionine,
N-(m-tolylaminocarbonyl)-tyrosine,
N-(p-tolylaminocarbonyl)-phenylalanine,
N-(p-tolylaminocarbonyl)-cysteine-S-benzyl,
N-(p-tolylaminocarbonyl)-methionine,
N-(p-tolylaminocarbonyl)-methionine,
N-(phenylaminocarbonyl)-methionine,
N-(p-tolylaminocarbonyl)-tyrosine,
N-(m-tolylaminocarbonyl)-methionine,
N-(p-tolylaminocarbonyl)-methionine,
N-(phenylaminocarbonyl)-methionine,
N-(m-tolylaminocarbonyl)-valine,
N-(m-tolylaminocarbonyl)-phenylglycine,
N-(m-tolylaminocarbonyl)-tyrosine,
2-O-(phenylaminocarbonyl)-mandelic acid,
2-O-(p-tolylaminocarbonyl)-mandelic acid,
2-O-(m-tolylaminocarbonyl)-mandelic acid,
2-O-(o-tolylaminocarbonyl)-mandelic acid,
2-O-(1-naphthylaminocarbonyl)-mandelic acid,
2-O-(3-isopropenyl-α,α-dimethylbenzylaminocarbonyl)-mandelic acid,
2-O-(benzylaminocarbonyl)-mandelic acid,
2-O-(phenethylaminocarbonyl)-mandelic acid,
2-O-(phenylaminocarbonyl)-lactic acid,
2-O-(p-tolylaminocarbonyl)-lactic acid,
2-O-(m-tolylaminocarbonyl)-lactic acid,
2-O-(o-tolylaminocarbonyl)-lactic acid,
2-O-(1-naphthylaminocarbonyl)-lactic acid,
2-O-(3-isopropenyl-α,α-dimethylbenzylaminocarbonyl)-lactic acid,
2-O-(benzylaminocarbonyl)-lactic acid, and
2-O-(phenethylaminocarbonyl)-lactic acid.

Examples of the acidic phosphate ester compound include methyl acid phosphate, ethyl acid phosphate, butyl acid phosphate, butoxyethyl acid phosphate, 2-ethylhexyl acid phosphate, isodecyl acid phosphate, isotridecyl acid phosphate, oleyl acid phosphate, tetracosyl acid phosphate, monobutyl phosphate, dibutyl phosphate, monoisodecyl phosphate, and bis(2-ethylhexyl)phosphate.

Although the compounds having phenolic hydroxy groups can develop the thermochromic properties most effectively, it is also possible to use compounds selected from the group consisting of aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

The component (c) of the reaction medium which reversibly induces an electron transfer reaction between the component (a) and the component (b) in a specific temperature range will be described. Examples of the component (c) include esters, ketones, ethers, alcohols, and acid amides.

As the component (c), there may be used a carboxylic acid ester compound which discolors with showing a large hysteresis characteristic with regard to a color density-temperature curve (a curve plotting a change in color density with a temperature change is different between the case where the temperature is changed from a low temperature side to a high temperature side and the case where the temperature is changed from a high temperature side to a low temperature side), is capable of forming a reversibly thermochromic composition having a color-memory property, and shows a ΔT value (melting point-cloud point) ranging from 5° C. to less than 50° C., for example, a carboxylic acid ester containing a substituted aromatic ring in the molecule, an ester of a carboxylic acid containing an unsubstituted aromatic ring with an aliphatic alcohol having 10 or more carbon atoms, a carboxylic acid ester containing a cyclohexyl group in the molecule, an ester of a fatty acid having 6 or more carbon atoms with an unsubstituted aromatic alcohol or phenol, an ester of a fatty acid having 8 or more carbon atoms with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, or distearin.

A fatty acid ester compound obtained from an aliphatic monohydric alcohol having an odd number not less than 9 of carbon atoms, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, are also effective.

Specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones with a total carbon number of 10 or more are effectively employed. Examples thereof include 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Furthermore, examples thereof include aryl alkyl ketones with a total carbon number of 12 to 24 such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers with a total carbon number of 10 or more are effectively employed. Examples thereof include dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

As the alcohols, an aliphatic monohydric saturated alcohol having 10 or more carbon atoms is effectively employed. Examples thereof include decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

As the acid amides, there may be mentioned hexanamide, heptanamide, octanamide, nonanamide, decanamide, undecanamide, laurylamide, tridecanamide, myristamide, palmitamide, stearamide, and docosanamide.

As the component (c), a compound expressed by the following Formula (1) may be used:

[Chem. 1]

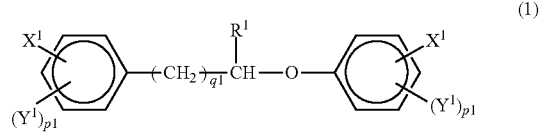

(1)

(wherein $R^1$ represents a hydrogen atom or a methyl group, q1 represents an integer of 0 to 2, one of $X^1$ represents —$(CH_2)_k OCOR'$ or —$(CH_2)_k COOR'$, the other represents a hydrogen atom; k represents an integer of 0 to 2; R' represents an alkyl or alkenyl group having 4 or more carbon atoms, each $Y_1$ independently represents an alkyl group having 1 to 4 carbon atoms, a methoxy group, or a halogen, and each p1 independently represents an integer of 0 to 3.)

Among compounds represented by the Formula (1), those in which $R_1$ is a hydrogen atom are suitable, because a reversibly thermochromic composition with a wider hysteresis width is obtainable, and those in which $R_1$ is a hydrogen atom and m is 0 are more suitable.

Among the compounds represented by the Formula (1), compounds represented by the following Formula (1a) are used more preferably:

[Chem. 1a]

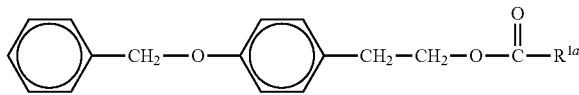

(1a)

(wherein $R^{1a}$ represents an alkyl or alkenyl group having 8 or more carbon atoms, preferably an alkyl group having 10 to 24 carbon atoms, and more preferably an alkyl group having 12 to 22 carbon atoms.)

Specific examples of the compound include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Further, as the component (c), a compound represented by the following Formula (2) may be used:

[Chem. 2]

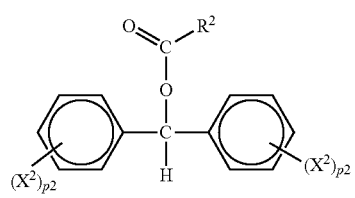

(2)

(wherein $R^2$ represents an alkyl or alkenyl group having 8 or more carbon atoms, each p2 independently represents an integer of 0 to 3, and each $X^2$ independently represents an alkyl group having 1 to 4 carbon atoms, an alkoxy group having 1 to 4 carbon atoms, or a halogen.)

Specific examples of the compound include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, or 1,1-diphenylmethyl octadecanoate.

Furthermore, as the component (c), a compound represented by the following Formula (3) may be used:

[Chem. 3]

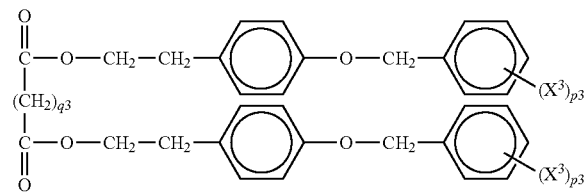

(3)

(wherein each $X^3$ independently represents an alkyl group having 1 to 4 carbon atoms, a methoxy group, or a halogen atom, each p3 independently represents an integer of 0 to 3, and q3 represents an integer of 1 to 20.)

Examples of the compound include diester of malonic acid with 2-[4-(4-chlorobenzyloxy)phenyl)]ethanol, diester of succinic acid with 2-(4-benzyloxyphenyl)ethanol, diester of succinic acid with 2-[4-(3-methylbenzyloxy)phenyl)] ethanol, diester of glutaric acid with 2-(4-benzyloxyphenyl) ethanol, diester of glutaric acid with 2-[4-(4-chlorobenzyloxy)phenyl)]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl)]ethanol, diester of suberic acid with 2-[4-(4-chlorobenzyloxy)phenyl)]ethanol, diester of suberic acid with 2-[4-(2,4-dichlorobenzyloxy)phenyl)] ethanol, diester of azelaic acid with 2-(4-benzyloxyphenyl) ethanol, diester of sebacic acid with 2-(4-benzyloxyphenyl) ethanol, diester of 1,10-decanedicarboxylic acid with 2-(4-benzyloxyphenyl)ethanol, diester of 1,18-octadecanedicarboxylic acid with 2-(4-benzyloxyphenyl) ethanol, and diester of 1,18-octadecanedicarboxylic acid with 2-[4-(2-methylbenzyloxy)phenyl)]ethanol.

Furthermore, as the component (c), a compound represented by the following Formula (4) may be used:

[Chem. 4]

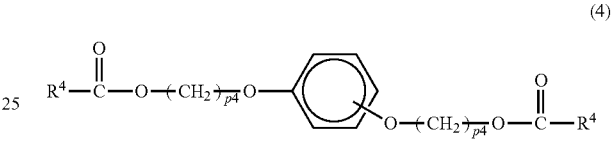

(4)

(wherein each $R^4$ independently represents an alkyl group having 1 to 21 carbon atoms or an alkenyl group, and each p4 independently represents an integer of 1 to 3.)

Examples of the compound include diester of capric acid with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of palmitic acid with 1,3-bis(2-hydroxyethoxy) benzene, diester of cyclohexanecarboxylic acid with 1,3-bis (2-hydroxyethoxy)benzene, diester of cyclohexanepropionic acid with 1,3-bis(2-hydroxyethoxy) benzene, diester of butyric acid with 1,4-bis(hydroxymethoxy)benzene, diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene, diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene, diester of myristic acid with 1,4-bis(2-hydroxyethoxy) benzene, and diester of cyclohexanepropionic acid with 1,4-bis(2-hydroxyethoxy)benzene.

Furthermore, as the component (c), a compound represented by the following Formula (5) may be used:

[Chem. 5]

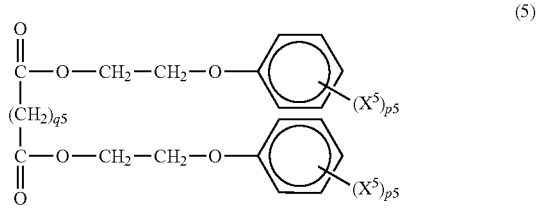

(5)

(wherein each $X^5$ independently represents an alkyl group having 1 to 4 carbon atoms, an alkoxy group having 1 to 4 carbon atoms, or a halogen atom, each p5 independently represents an integer of 0 to 3, and q5 represents an integer of 1 to 20.)

Examples of the compound include diester of succinic acid with 2-phenoxyethanol, diester of suberic acid with 2-phenoxyethanol, diester of sebacic acid with 2-phenoxyethanol, diester of 1,10-decanedicarboxylic acid with 2-phenoxyethanol, or diester of 1,18-octadecanedicarboxylic acid with 2-phenoxyethanol.

Furthermore, as the component (c), a compound represented by the following Formula (6) may be used:

[Chem. 6]

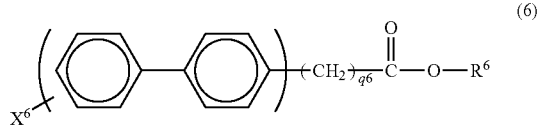

(6)

(wherein $R^6$ represents an alkyl group having 4 to 22 carbon atoms, a cycloalkyl alkyl group, a cycloalkyl group, or an alkenyl group having 4 to 22 carbon atoms, $X^6$ represents a hydrogen atom, an alkyl group having 1 to 4 carbon atoms, an alkoxy group having 1 to 4 carbon atoms, or a halogen atom, and q6 represents 0 or 1.)

Examples of the compound include decyl 4-phenylbenzoate, lauryl 4-phenylbenzoate, myristyl 4-phenylbenzoate, cyclohexylethyl 4-phenylbenzoate, octyl 4-biphenylacetate, nonyl 4-biphenylacetate, decyl 4-biphenylacetate, lauryl 4-biphenylacetate, myristyl 4-biphenylacetate, tridecyl 4-biphenylacetate, pentadecyl 4-biphenylacetate, cetyl 4-biphenylacetate, cyclopentyl 4-biphenylacetate, cyclohexylmethyl 4-biphenylacetate, hexyl 4-biphenylacetate, and cyclohexylmethyl 4-biphenylacetate.

Furthermore, as the component (c), a compound represented by the following Formula (7) may be used:

[Chem. 7]

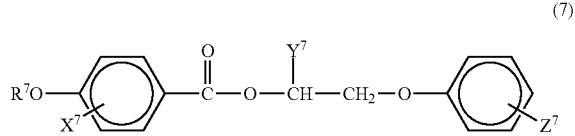

(7)

(wherein $R^7$ represents an alkyl group having 3 to 18 carbon atoms or an aliphatic acyl group having 3 to 18 carbon atoms, $X^7$ represents a hydrogen atom, an alkyl group having 1 to 3 carbon atoms, an alkoxy group having 1 or 2 carbon atoms, or a halogen atom, $Y^7$ represents a hydrogen atom or a methyl group, and $Z^7$ represents a hydrogen atom, an alkyl group having 1 to 4 carbon atoms, an alkoxy group having 1 or 2 carbon atoms, or a halogen atom).

Examples of the compound include phenoxyethyl 4-butoxybenzoate, phenoxyethyl 4-pentyloxybenzoate, phenoxyethyl 4-tetradecyloxybenzoate, an ester of phenoxyethyl 4-hydroxybenzoate and dodecanoic acid, and a dodecyl ether of phenoxyethyl vanilliate.

Furthermore, as the component (c), a compound represented by the following Formula (8) may be used:

[Chem. 8]

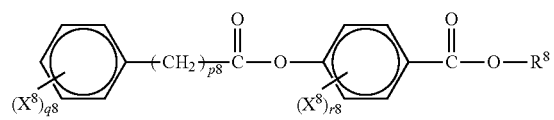

(8)

(wherein $R^8$ represents an alkyl group having 4 to 22 carbon atoms, an alkenyl group having 4 to 22 carbon atoms, a cycloalkylalkyl group, or a cycloalkyl group, each $X^8$ independently represents an alkyl group, an alkoxy group, or a halogen atom, p8 represents 0 or 1, q8 represents 0 to 5, and r8 represents 0 to 4.)

Examples of the compound include a benzoic acid ester of octyl p-hydroxybenzoate, a benzoic acid ester of decyl p-hydroxybenzoate, a p-methoxybenzoic acid ester of heptyl p-hydroxybenzoate, an o-methoxybenzoic acid ester of dodecyl p-hydroxybenzoate, and a benzoic ester of cyclohexylmethyl p-hydroxybenzoate.

Furthermore, as the component (c), a compound represented by the following Formula (9) may be used:

[Chem. 9]

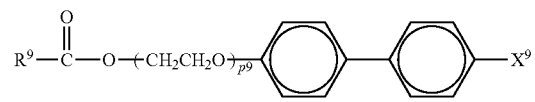

(9)

(wherein $R^9$ represents an alkyl group having 3 to 17 carbon atoms, a cycloalkyl group having 3 to 8 carbon atoms, or a cycloalkyl alkyl group having 5 to 8 carbon atoms, $X^9$ represents a hydrogen atom, an alkyl group having 1 to 5 carbon atoms, a methoxy group, an ethoxy group, or a halogen atom, and p9 represents an integer of 1 to 3.)

Examples of the compound include diester of 4-phenylphenol ethylene glycol ether and cyclohexanecarboxylic acid, diester of 4-phenylphenol diethylene glycol ether and lauric acid, diester of 4-phenylphenol triethylene glycol ether and cyclohexanecarboxylic acid, diester of 4-phenylphenol ethylene glycol ether and octanoic acid, diester of 4-phenylphenol ethylene glycol ether and nonanoic acid, diester of 4-phenylphenol ethylene glycol ether and decanoic acid, and diester of 4-phenylphenol ethylene glycol ether and myristic acid.

As an electron-accepting compound, a microcapsule pigment encapsulating a reversibly thermochromic composition of heat color-developing type (a color is developed by heating and lost by cooling) using a specific alkoxyphenol compound having straight chain or side chain alkyl group having 3 to 18 carbon atoms (JP H11-129623A, JP H11-5973 A), a specific hydroxybenzoic ester (JP 2001-105732 A), a gallic ester (JP S51-44706B, JP 2003-253149 A) or the like may be applied.

Though the ratio of the components (a), (b) and (c) to be mixed depends on the concentration, discoloration temperature, discoloration mode and kind of each component, the component ratio at which desired discoloration characteristics can be generally obtained is within the range of 0.1 to 50 parts by mass, preferably 0.5 to 20 parts by mass of the component (b), and within the range of 1 to 800 parts by mass, preferably from 5 to 200 parts by mass of the component (c), based on 1 part by mass of the component (a).

In this regard, it is also possible to cause interchangeable color change from a color (1) to a color (2) by incorporating a coloring agent such as a non-thermochromic dyestuff or pigment into the microcapsule pigment or ink.

Although a method of encapsulating the reversibly thermochromic composition in a microcapsule is not particularly limited, examples of the method include interfacial polymerization, interfacial polycondensation, in situ polymerization, submerged coat hardening, phase separation from an aqueous solution, phase separation from an organic solvent, melt dispersion cooling, aerial suspension coating and spray drying. The method is selected as needed, depending on the use purpose Examples of the material of the capsule include organic resins such as epoxy resins, urea resins, urethane resins, and isocyanate resins. In the present invention, since a surface of pigment particles is composed of an organic material, excellent properties are exhibited by three interactions with a polymer of N-vinyl-2-pyrrolidone described later and glycerin. Therefore, the material of the capsule needs to be an organic material.

Further, the microcapsule can be put into practical use after forming a secondary resin coating film on the surface thereof in accordance with the intended use, so as to impart the microcapsule with durability or to modify the surface properties.

The microcapsule pigment preferably has an average particle diameter of 0.1 to 5.0 µm, more preferably 0.1 to 4.0 µm, and still more preferably 0.5 to 3.0 µm.

The microcapsule pigment preferably satisfies the requirement that a mass ratio between the reversibly thermochromic composition and the wall membrane of the microcapsule falls within the range of 7:1 to 1:1 (ratio by mass), preferably 6:1 to 1:1.

When the average particle diameter of the microcapsule pigment exceeds 5.0 µm, it is difficult to obtain a smooth writing feeling when the microcapsule pigment is used in a writing instrument, and when an average value of a maximum outer diameter is less than 0.1 µm, it becomes difficult to exhibit high-density color development.

The microcapsule pigment having an average particle diameter in the above range, particularly within the range of 0.5 to 3.0 µm, exhibits high-density color development, and a good ejection property is easily obtained when the microcapsule pigment is used in a writing instrument.

When the ratio of the reversibly thermochromic composition to the wall membrane is larger than the above range, the thickness of the wall membrane becomes too thin, and resistance to pressure and heat tends to decrease. When the ratio of the wall membrane to the reversibly thermochromic composition is larger than the above range, the color density and vividness at the time of color development tend to decrease.

In the measurement of the average particle diameter, a region of particles is determined using an image analysis type particle size distribution measuring software "MacView" manufactured by Mountech Co., Ltd., a projected area equivalent circle diameter (Heywood diameter) is calculated from the area of the region of particles, and the average particle diameter is measured as an average particle diameter of particles equivalent to an equal volume sphere based on the calculated value.

When the particle diameter of all particles or most of the particles exceed 0.2 µm, the average particle diameter can be measured as an average particle diameter of particles equivalent to an equal volume sphere by the Coulter method using a particle size distribution analyzer (manufactured by Beckman-Coulter, Inc., product name: Multisizer 4e). In addition, a volume-based particle diameter and the average particle diameter (median diameter) may be measured using a laser diffraction/scattering-type particle size distribution analyzer (device name: LA-300, manufactured by Horiba, Ltd.) after calibration based on the numerical values measured using a standard sample or the analyzer by the Coulter method.

<Polymer of N-vinyl-2-pyrrolidone>

The ink composition according to the present invention further includes a polymer of N-vinyl-2 pyrrolidone (hereinafter, may be simply referred to as "PVP"). In the ink composition according to the present invention, PVP has an effect of simultaneously completing various properties. Specifically, there are an effect of adjusting a viscosity of the ink composition, an effect of suppressing aggregation of the microcapsule pigment, an effect of improving fixability and adhesiveness of the ink component to paper, and the like. Furthermore, according to the study of the present inventors, it has been found that the ink composition containing the microcapsule pigment has an effect of suppressing drying up. For example, when the ink composition is used for a ballpoint pen or a marking pen, particularly for a knock-type ballpoint pen, its pen tip is placed in a situation where the pen tip is easy to dry. As a result, these writing instruments may become unwritable. Although such a state is referred to as dry-up, according to the present invention, by using PVP in a specific ink composition, the dry-up can be suppressed, and excellent writability can be achieved.

Although PVP is obtained by polymerizing N-vinyl-2-pyrrolidone, it is necessary to use PVP having a degree of polymerization of 2 to 20, and the degree of polymerization is preferably 2 to 10 and more preferably 2 to 6. When the polymerization degree is in such a range, an increase in the viscosity of the ink composition and the aggregation of the microcapsule pigment can be suppressed when water in the ink composition has evaporated. When PVP having an excessively high polymerization degree is used, the viscosity of the ink composition may also be excessively high, which adversely affects writing performance, and thus attention is required.

<Glycerin>

The ink composition according to the present invention further includes glycerin. Glycerin may be used as an organic solvent or a viscosity modifier for a general ink composition. However, in the present invention, glycerin exhibits a conventionally unknown function. That is, when the microcapsule pigment having the organic resin on the surface and PVP coexist at a specific ratio, an interaction between three components occurs, and remarkable improvement in writing characteristics can be achieved.

<Water>

The ink composition according to the present invention is an aqueous ink composition and contains water as a main solvent. The water used in the present invention is not particularly limited, and for example, ion-exchanged water, ultrafiltration water, distilled water, or the like can be used.

<Composition of Ink Composition>

In the present invention, a content ($P_{MC}$) of the microcapsule pigment with respect to a total mass of the ink composition needs to be 5 to 40% by mass, and is preferably 10 to 30% by mass, and more preferably, 10 to 25% by mass can be blended. For example, when the ink composition is used for the applications such as a ballpoint pen, a blending amount of a general pigment is less than 10% by mass with respect to a total amount of the ink composition; however, when a microcapsule pigment is used as a colorant, it is preferable to increase the blending amount for realizing sufficient color development. In general, an ink composition having a high content of a microcapsule pigment has a higher solid content than that of a general ink; and therefore, performance such as dry-up performance may be deteriorated. However, the ink composition according to the present invention solves such problems by blending specific materials in specific ratios.

In the present invention, a content ($P_{PVP}$) of PVP with respect to the total mass of the ink composition is preferably 1 to 20% by mass, and more preferably 2 to 10% by mass. When the content of PVP is within this range, dischargeability of the ink composition from the pen tip is kept good, and a high handwriting density can be achieved.

In the present invention, a content ($P_G$) of glycerin is preferably 1 to 20% by mass, and more preferably 2 to 10% by mass with respect to the total mass of the ink composition. When the content of glycerin is within this range, the dischargeability of the ink composition from the pen tip is kept good, and a clear handwriting can be formed.

The ink composition of the present invention contains, as essential components, a microcapsule pigment, PVP, glycerin, and water, and a total content ($P_{MC}+P_{PVP}+P_G$) of the microcapsule pigment, PVP, and glycerin is preferably 20 to 50% by mass, and more preferably 20 to 30% by mass. When $P_{MC}+P_{PVP}+P_G$ is within this range, it is possible to suppress blurring at the start of writing and achieve high writing characteristics while maintaining a high handwriting density.

In the present invention, the microcapsule pigment, PVP, and glycerin are blended at a specific ratio. Specifically, $0.3 \leq P_{MC}/(P_{PVP}+P_G) \leq 4$, and $0.2 \leq P_{PVP}/P_G \leq 5$ are required to be satisfied, and $0.5 \leq P_{MC}/(P_{PVP}+P_G) \leq 2.5$, or $0.3 \leq P_{PVP}/P_G \leq 2.5$ is preferable.

In the present invention, the expected effect is exhibited only when the microcapsule pigment, PVP, and glycerin are blended so as to be within the above range. In other words, it is considered that the effect of the present invention is exerted by the interaction when the three components are combined at a specific ratio. That is, the ink composition according to the present invention simultaneously realizes writing density, dry-up resistance, temporal stability, and the like. However, this is not merely an expression of the effect of each component. For example, PVP may be used as a material for improving the dry-up resistance of the ink composition. However, according to the study of the present inventors, it has been found that when microcapsules and glycerin coexist, the dry-up resistance may decrease by increasing an amount of PVP (see the section of Examples). When a general inorganic pigment is used as the pigment, the effect of the present invention is not exhibited even if the pigment is blended at the ratio specified in the present invention. It is considered that since the microcapsule pigment used in the present invention has an organic resin on the surface, an interaction occurs between the organic resin and PVP and glycerin to improve temporal stability and writing characteristics. That is, in an ink composition in which a microcapsule pigment, PVP, and glycerin coexist, it has been unexpected that an ink composition having excellent properties can be obtained when the mutual ratio of these components is a specific ratio.

<Other Components>

In the ink composition according to the present invention, in addition to the essential components described above, optional components can be combined as long as the effects of the present invention are not impaired.

As one of the optional components, a polysaccharide can be used. The polysaccharides provide various effects, and mainly provide effects such as adjustment of the ink viscosity (thickener), application of shear thinning (shear thinning agent), and improvement of dry-up resistant performance.

Here, the shear thinning is a property that has a high viscosity when allowed to stand and the viscosity decreases when a shear force is applied. Some ballpoint pens contain an ink composition generally called a gel ink. The gel ink composition has a high viscosity when allowed to stand without applying shear stress, and is stably held in the writing instrument. At the time of writing, the viscosity of the ink near the ball is lowered by a high shear force generated by high-speed rotation of the ball, so that the ink is discharged from a gap between the ball and a ball housing portion and transferred to a paper surface. A gel ink can be obtained by combining the shear thinning agent with the ink composition.

When a polysaccharide is used, examples of suitable polysaccharides include succinoglycan, xanthan gum, welan gum, guar gum, locust bean gum, carrageenan, diutan gum and derivatives thereof, cellulose derivatives, glycomannan, thickening polysaccharides having gelling ability and extracted from seaweed such as agar and carrageenan, and dextrin. Among these polysaccharides, succinoglycan and xanthan gum are preferable because they have a large effect of imparting the shear thinning, and succinoglycan is more preferable. As the succinoglycan, those having an average molecular weight of about 100 to 8,000,000 can be suitably used. Examples of the cellulose derivative include hydroxymethyl cellulose.

When the ink composition according to the present invention contains succinoglycan or xanthan gum, a content of succinoglycan or xanthan gum based on the total mass of the ink composition is preferably 0.01 to 1.0% by mass. When these contents are within the ranges, the ink discharge characteristics from the pen tip can be maintained at a high level, and the aggregation of the microcapsule pigment can be suppressed.

When dextrin or a cellulose derivative is used as the polysaccharide, it may be possible to simultaneously obtain a high improving effect such as adjustment of ink viscosity, application of the shear thinning, and improvement of the dry-up resistant performance. Among these polysaccharides, dextrin is preferable because it has a large effect of improving the dry-up resistant performance.

The dextrin is preferably a sugar mixture containing an octa- or higher starch-saccharified product and/or a reduced product thereof. The sugar mixture preferably contains 30% by mass or more, more preferably 50% or more, and particularly preferably 70% or more of an octa- or higher starch-saccharified product and the like. Since such dextrin is excellent in film-forming property, the dextrin is preferable when the ink composition is applied to the writing instrument because it has a great effect of suppressing water evaporation from the pen tip.

When the ink composition according to the present invention contains dextrin or a cellulose derivative, their contents based on the total mass of the ink composition are preferably 0.1 to 5% by mass. When the content of the dextrin or the cellulose derivative is within the range, the ink discharge characteristics from the pen tip can be maintained at a high level, and ink sagging and water evaporation from the pen tip can be suppressed.

These polysaccharides can be used alone or in combination of two or more kinds thereof.

Thickeners other than polysaccharides can also be used. Examples of other materials that can be used as thickeners include alginic acid alkyl esters, a polymer with a methacrylic acid alkyl ester as a main constituent having a molecular weight of 100,000 to 150,000, benzylidene sorbitol, benzylidene xylitol, and a derivative thereof, a crosslinkable acrylic polymer, an inorganic fine particle, polyglycerol fatty acid ester, polyoxyethylene sorbitan fatty acid ester, poly(ethylene glycol) fatty acid ester, polyoxyethylene castor oil, polyoxyethylene lanolin, lanolin alcohol, and a derivative of beeswax, a polyoxyethylene alkyl ether, a polyoxypropylene alkyl ether, a polyoxyethylene alkylphenyl ether, a nonionic surfactant with a HLB value of 8 to 12, such as a fatty acid amide, and a salt of a dialkyl or dialkenyl sulfosuccinic acid.

Another example of the optional component is a surfactant. As the surfactant, any one of a nonionic surfactant, an anionic surfactant, a cationic surfactant, an ampholytic surfactant, and the like can be preferably used. Examples of the surfactant include a phosphate ester-based surfactant, a silicone-based surfactant, a surfactant having an acetylene bond in its structure, and a fluorine-based surfactant. These surfactants can be suitably selected according to the components, applications, and the like of the ink composition. For example, when the ink composition is used for an aqueous ballpoint pen, a phosphate ester-based surfactant is preferable. This is because the phosphate ester-based surfactant exhibits a good lubricating effect in the tip and can smoothly rotate the ball. Specific examples of the phosphoric acid ester-based surfactant include phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof. When the ink composition according to the present invention contains a surfactant, the content of the surfactant is preferably 0.1 to 2.0% by mass, and more preferably 0.3 to 1.5% by mass, based on the total mass of the ink composition.

Another example of the optional component is a pH regulator. In order to regulate pH of the ink composition in a suitable range, various acids or bases can be used as the pH regulators. Examples of such a pH regulator include (a) an inorganic basic compound such as ammonia or sodium hydroxide, (b) an inorganic acidic compound such as phosphoric acid, hydrochloric acid, sulfuric acid or nitric acid, (c) an inorganic salt compound such as sodium carbonate or sodium phosphate, (d) an organic basic compound such as a water-soluble amine compound such as triethanolamine or diethanolamine, a urea derivative such as urea, dimethylurea, diethylurea, hydroxymethylurea or hydroxyethylurea, acetamide or an amide compound such as N-methylacetamide, (e) an organic acidic compound such as lactic acid, citric acid or tartaric acid, and (f) an organic salt compound such as sodium acetate, sodium bicarbonate or sodium tartrate. The content of the pH regulator is preferably 0.1 to 5% by mass, more preferably 0.5 to 2% by mass, with respect to the ink composition.

In addition, the ink composition according to the present invention can be obtained by combining (i) rust inhibitors such as benzotriazole, tolyltriazole, dicyclohexylammonium nitrite, diisopropylammonium nitrite, and saponin;

(ii) antiseptics or antifungals such as phenol, sodium of 1,2-benzothiazolin-3-one, sodium benzoate, sodium dehydroacetate, potassium sorbate, propyl p-hydroxybenzoate, and 2,3,5,6-tetrachloro-4-(methylsulfonyl) pyridine;

(iii) specific gravity adjusters such as sodium isotungstate, sodium metatungstate, and sodium paratungstate;

(iv) bubble absorbers such as ascorbic acids, erythorbic acids, α-tocopherols, catechins, synthetic polyphenols, kojic acid, alkylhydroxylamines, oxime derivatives, α-glucosylrutin, α-lipoic acid, phosphonate, phosphinate, sulfite, sulfoxylate, dithionite, thiosulfate, and thioureadioxide;

(v) lubricants such as a metal soap, 2,5-dimercapto-1,3,4-thiadiazole and salts and oligomers thereof, 3-amino-5-mercapto-1,2,4-triazole, thiocarbamate, dimethyldithiocarbamate, α-lipoic acid, a condensate of N-acyl-L-glutamic acid and L-lysine and salts thereof, ethylene oxide-added cationic surfactant, N-acylamino acid-based surfactant, dicarboxylic acid-based surfactant, and R-alanine type surfactants;

(vi) water-soluble organic solvents such as ethanol, propanol, butanol, sorbitol, glycol solvents, sulfolane, 2-pyrrolidone, N-methyl-2-pyrrolidone, an oligomer of N-vinyl-2-piperidone, N-vinyl-2-pyrrolidone, N-cyclohexyl-2-pyrrolidone, ε-caprolactam, and N-vinyl-ε-caprolactam;

(vii) glycol-based solvents such as ethylene glycol, diethylene glycol, thiodiethylene glycol, polyethylene glycol, propylene glycol, butylene glycol, ethylene glycol monomethyl ether, ethylene glycol monoethyl ether, diethylene glycol monomethyl ether, diethylene glycol monoethyl ether, and ethylene glycol monomethyl ether acetate;

(viii) water-soluble or water-insoluble resins such as polyamide resin, polyurethane resin, polyester resin, epoxy resin, melamine resin, phenol resin, silicone resin, polyvinyl alcohol, polyvinylpyrrolidone having a polymerization degree of more than 20, polyvinyl acetate, polyvinyl chloride, polyvinylidene chloride, polystyrene, acrylic acid resin, maleic acid resin, gum arabic, cellulose and the like, derivatives thereof, and copolymers of the above-mentioned resins;

(ix) pigments other than microcapsule pigments, such as an aluminum powder and metal pigments in which an aluminum powder surface is treated with a colored resin, metallic glossy pigments with a metal vapor deposition film formed on a transparent or colored transparent film, phosphorescent pigments, and bright pigments such as natural mica as a core material, synthetic mica, glass pieces, alumina, and pearl pigments in which a surface of a transparent film piece is coated with a metal oxide such as titanium oxide; and (x) other components such as casein and thiophosphite triesters such as tri(alkoxycarbonylmethyl)thiophosphites and tri(alkoxycarbonylethyl)thiophosphites.

<Physical Properties of Ink Composition>

The ink composition according to the present invention can be used for various writing instruments. At this time, physical properties required for the ink composition vary depending on the type of the writing instrument.

For example, when the ink composition according to the present invention is used in a ballpoint pen, the viscosity of the ink composition is preferably 1 to 2,000 mPa·s when measured under the conditions of 20° C. and a rotation speed of 3.84 $sec^{-1}$. In consideration of suppressing sinking and aggregation of the microcapsule pigment, the viscosity is more preferably 300 to 1,500 mPa·s, and particularly preferably 500 to 1,000 mPa·s. When the viscosity is measured under the conditions of 20° C. and a rotation speed of 384 $sec^{-1}$, the viscosity is preferably 1 to 200 mPa·s, and in consideration of improving ink dischargeability from the pen tip, the viscosity is more preferably 10 to 100 mPa·s, and particularly preferably 20 to 50 mPa·s. By having such a range, dispersion stability and easy fluidity of the composition in a mechanism of the ballpoint pen can be maintained at a high level.

The ink viscosity can be measured using a DV-II viscometer (cone rotor CPE 42) manufactured by Brookfield Engineering Laboratories, Inc. under the conditions of a shear rate of 3.84 $sec^{-1}$ (1 rpm) or a shear rate of 384 $sec^{-1}$ (100 rpm) in an environment of 20° C.

When the ink composition according to the present invention is used in a ballpoint pen, a surface tension of the ink composition is preferably 20 to 50 mN/m, more preferably 25 to 45 mN/m in an environment of 20° C. When the surface tension is within the above numerical range, when the ink composition is applied to a sheet of paper, wettability of the ink composition to a surface to be coated can be improved, and there is a tendency that bleeding and passing through the surface to be coated can be prevented.

When the ink composition according to the present invention is used in a ballpoint pen, the pH of the ink composition is preferably 3 to 10, more preferably 4 to 9, and particularly preferably 4 to 8 at room temperature (25° C.), for example. When the pH is regulated to such a range, aggregation and sinking of the contained microcapsule pigment in a low temperature range are suppressed.

When the ink composition according to the present invention is used in a marking pen, the viscosity of the ink composition is preferably 1 to 30 mPa·s, more preferably 2 to 20 mPa·s when measured under the conditions of 20° C. and a rotation speed of 30 rpm. The surface tension of the ink composition is preferably 25 to 45 mN/m, more preferably 30 to 40 mN/m in an environment of 20° C.

When the ink composition according to the present invention is used in a fountain pen, the viscosity of the ink composition is preferably 1 to 20 mPa·s, more preferably 1 to 10 mPa·s when measured under the conditions of 20° C. and a rotation speed of 30 rpm. The surface tension of the ink composition is preferably 30 to 65 mN/m, more preferably 35 to 55 mN/m in an environment of 20° C.

The viscosity of the ink composition can be measured using a BL-type rotational viscometer (product name: TVB-M-type viscometer, B-type rotor, manufactured by Toki Sangyo Co., Ltd.). The surface tension can be measured by a vertical plate method, using a surface tension measuring device manufactured by Kyowa Interface Science, Inc and a platinum plate.

<<Method of Producing Ink Composition>>

The ink composition according to the present invention can be produced by any conventionally known method. Specifically, the above components are added in required amounts and mixed with various agitators such as a propeller stirrer, a homodisper, or a homomixer, or various dispersers such as a bead mill, whereby the ink composition can be produced.

<<Writing Instrument>>

The ink composition according to the present invention is used by filling it in a writing instrument such as a fudepen, a fountain pen, and a calligraphy pen in addition to a marking pen or an aqueous ballpoint pen having a marking pen tip or a ballpoint pen tip attached to a writing front-end.

When the ink composition is filled in the aqueous ballpoint pen, the structure and shape of the ballpoint pen itself are not particularly limited. Examples thereof include a ballpoint pen having a structure in which ink is placed directly inside an axial barrel, an ink flow adjusting member including a comb groove-shaped ink flow adjusting member and a fiber bundle is interposed, and the ink flow adjusting member and a tip are connected, and a ballpoint pen having an ink-storing tube in which an ink is filled in an axial barrel, in which the ink-storing tube is connected with a tip where a ball is mounted on its front-end, and a liquid plug for preventing backflow is closely contacted in the edge of the ink.

The ballpoint pen tip will be explained in more detail. There can be applied a tip (pipe type ballpoint pen tip) formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring. The ballpoint pen tip preferably includes a metal pipe in which at least a tip portion is a straight cylindrical body (straight tubular cylindrical body). Examples of the shape of such a ballpoint pen tip include a ballpoint pen tip formed from a metal pipe in which the entire ballpoint pen tip is a straight cylindrical body, and a ballpoint pen tip having a straight metal pipe at the tip portion and having rearward thereof a shape in which an outer diameter and an inner diameter increase. Among these ballpoint pen tips, the latter is preferable because the ink dischargeability is good.

The ball is generally made of cemented carbide, stainless steel, ruby, ceramic, resin, rubber, and the like The ball diameter that can be applied is generally 0.2 to 3.0 mm, and is preferably 0.25 to 1.5 mm, more preferably 0.25 to 1.0 mm, and particularly preferably 0.25 to 0.5 mm. In the pipe type ballpoint pen tip, the ink composition according to the present invention is combined with a ballpoint pen having a ball diameter of, for example, 0.25 to 1.0 mm, preferably 0.25 to 0.7 mm, particularly preferably 0.25 to 0.5 mm, whereby a ballpoint pen excellent in the ink dischargeability and the dry-up resistance can be obtained.

When the aqueous ballpoint pen is filled with the ink composition according to the present invention, the ball diameter and the ink consumption amount preferably satisfy a specific relationship. Specifically, when the ink consumption amount per 100 m of the aqueous ballpoint pen is A (mg) and the ball diameter is B (mm), a relationship of 200≤A/B≤800 is preferable, and a relationship of 300≤A/B≤700 is preferable. This is because when the relationship is within the above range, ink fluidity is improved by setting a proper ink consumption amount with respect to the ball diameter, and a good handwriting is easily obtained by suppressing handwriting faint and the like.

As for the ink consumption amount, a spiral writing test is performed using five test samples at a writing speed of 4 m/min under the conditions of a writing angle of 70° and a writing load of 100 g on JIS P3201 writing paper at 20° C., and an average value of the ink consumption amount per 100 m is defined as the ink consumption amount per 100 m.

A movable amount (clearance) of the ball in the ballpoint pen tip in a vertical axis direction is preferably 20 to 60 μm, preferably 30 to 45 μm at the time of manufacturing or starting the use of the ballpoint pen. This is because a good handwriting is easily obtained by suitably adjusting an ink discharge amount and suppressing line skipping, faint, and the like when the movable amount is within the above range, and, in addition, the ratio A/B is also easily adjusted when the clearance is within the above range. In the present invention, the ink composition contains the microcapsule pigment, and the ink dischargeability may be improved by adjusting the clearance according to the average particle diameter. From such a viewpoint, a ratio D/G of an average particle diameter D (μm) of microcapsules based on a clearance G (μm) preferably satisfies $1/150 \leq D/G \leq 1/3$, and more preferably satisfies $1/100 \leq D/G \leq 1/5$.

The movable amount (clearance) of the ball in the ballpoint pen tip in the vertical axis direction indicates a movable distance of the ball in the vertical axis direction of a ballpoint pen tip body. Here, the movable amount generally increases depending on the use because the ball and a ball seat are worn by the use. The movable amount is related to the ink discharge amount. Therefore, in general, since the movable amount at the time of manufacturing or starting the use of the ballpoint pen is set within the above range, it is preferable that the movable amount is within the above range until the end of use of the ballpoint pen in order to achieve stable writing characteristics.

As the ink-storing tube which stores the ink, for example, a molded article formed of a thermoplastic resin such as polyethylene, polypropylene, polyethylene terephthalate, or nylon can be used. In order to prevent the ink composition to be contained from being modified by oxygen, a molded body formed from a resin having low oxygen permeability, for example, an ethylene vinyl alcohol copolymer resin, a vinylidene chloride resin, an acrylonitrile resin, a polyester resin, or the like is preferably used. The ink-storing tube may have a single layer structure or a multilayer structure. When the ink-storage tube having a multilayer structure is employed, at least one layer is preferably formed from an ethylene vinyl alcohol copolymer resin, a vinylidene chloride resin, an acrylonitrile resin, or a polyester resin. When the ink-storage tube having a multilayer structure including three or more ink-storage tubes is employed, and layers formed of an ethylene vinyl alcohol copolymer resin, a vinylidene chloride resin, an acrylonitrile resin, and a polyester resin are combined, these layers are preferably arranged at other than an outermost layer and an innermost layer.

The ink-storing tube may be directly connected with the tip, or the ink-storing tube may be connected with the tip via a connection member.

Incidentally, the ink-storing tube may be a refill type in which the refill is stored in an axial barrel made of a resin or metal, or the ink may be directly filled in an axial barrel in which the axial barrel mounting a tip in its front-end is used itself as an ink-storing tube.

An ink follower is preferably filled at the rear end of the ink stored in the ink-storing tube. The composition of the ink follower includes a non-volatile liquid or a hardly volatile liquid.

Specific examples thereof include vaseline, spindle oil, castor oil, olive oil, mineral oil refineries, liquid paraffine, polybutene, α-olefine, oligomer and co-oligomer of α-olefine, dimethyl silicone oil, methylphenyl silicone oil, amino modified silicone oil, polyether modified silicone oil, and fatty acid modified silicone oil. It can be used alone or in combination of two or more thereof.

It is preferable that the viscosity of the non-volatile liquid and/or hardly volatile liquid be increased to a suitable viscosity by adding a thickening agent. There may be mentioned, as the thickening agent, silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound. Further, it is also possible to use a liquid ink follower in combination with a solid ink follower.

In the case where the ink composition is filled in a marking pen, the structure and shape of the marking pen itself are not particularly limited. Examples thereof include a marking pen in which an ink occlusion body containing fiber bundle is embedded in an axial barrel, a marking pen tip containing a processed fiber or a resin molded product having a capillary gap therein is mounted directly or via a connection member on the axial barrel, and an ink is impregnated into the ink occlusion body of the marking pen formed by connecting the ink occlusion body and the tip, a marking pen having a structure in which ink is placed directly inside an axial barrel, an ink flow adjusting member including a comb groove-shaped ink flow adjusting member and a fiber bundle is interposed, and the ink flow adjusting member and the tip are connected, and a marking pen in which the tip and the ink-storing tube are arranged through a valve body that opens by pressing the tip and the ink is stored directly in the ink-storing tube.

The tip is a generally known porous member having communication pores of which porosity is selected within the range of about 30 to 70%, made of processed resin of fibers, fusion processed bodies of hot-melt fiber, or a felt, or an extrusion molded product of a synthetic resin having a plurality of ink delivering holes extending in the axial direction, and the tip is provided for practical use by processed its one end in a cannonball form, a rectangular form, or a chisel form depending on the purpose.

The ink occlusion body is configured by bundling crimped fibers in a length direction, incorporating them into a covering material such as a plastic tube or a film, and adjusting its porosity within a range of about 40 to 90%.

As the valve body, a generally known pumping type may be used, and also it is preferred the one in which a spring pressure is adjusted so that the valve can be opened by pen pressure.

A marking pen suitable for the ink composition according to the present invention is a marking pen in which an ink occlusion body containing fiber bundle is embedded in an axial barrel, a marking pen tip containing a processed fiber or a resin molded product having a capillary gap therein is mounted directly or via a connection member on the axial barrel, and an ink is impregnated into the ink occlusion body of the marking pen formed by connecting the ink occlusion body and the tip, or a marking pen having a structure in which ink is placed directly inside an axial barrel, an ink flow adjusting member including a comb groove-shaped ink flow adjusting member and a fiber bundle is interposed, and the ink flow adjusting member and the tip are connected. The writing instrument is more preferably the marking pen in which the ink occlusion body containing fiber bundle is embedded in the axial barrel, the marking pen tip containing the processed fiber or the resin molded product having the capillary gap therein is mounted directly or via the connection member on the axial barrel, and the ink is impregnated into the ink occlusion body of the marking pen formed by connecting the ink occlusion body and the tip. Since the writing instrument having such a mechanism is required to include the ink composition having low cohesiveness of the microcapsule pigment and easy fluidity from the viewpoint of ink suppliability to the tip, the ink composition according to the present invention is particularly suitable for writing instruments having the above mechanism and can be preferably used as a reversibly thermochromic aqueous ink composition for a marking pen.

The shape of the ballpoint pen or marking pen is not limited to the above-described one, but may be a multiple writing instrument (i.e., a both head type or a pen-front drawing type) in which tips of different type are provided or pen ends for introducing inks of different colors are provided.

The writing instrument having the above structure may include a cap for protection of the pen tip and prevention of drying.

The writing instrument may be a retractable writing instrument having a structure in which an ink occlusion body impregnated with ink is stored in an ink-storing tube, a pen body is attached to a writing front-end to prepare a refill, and the refill is stored in an axial barrel so that the writing front-end is protruded from an opening of the axial barrel by actuation of an in-and-out type mechanism. The ink composition according to the present invention is preferably used in such a retractable writing instrument because the writing characteristics are less deteriorated due to drying of the pen tip.

A method for operating the in-and-out type mechanism may be, for example, a knock type, a rotation type, or a slide type.

The handwriting formed with a writing instrument storing the ink composition can be discolored by rubbing with a finger or application of a heating tool or a cooling tool.

As the heating tool, for example, an electro-heating discoloration device equipped with a resistance heating element, a heating discoloration device loaded with hot water or the like, or a hair dryer can be suitably used; however, a friction member or a friction body is preferably used as a means which enables discoloration by a simple method.

As the friction member or the frictional body, an elastic body such as an elastomer or a plastic foamed body, which has a good elasticity and can generate frictional heat by an appropriate friction is preferable; however, a plastic molded body, stone, wood, metal and cloth may be used as well.

In this connection, the handwriting can be rubbed by means of a gum eraser but, since bits of the eraser are generated at rubbing, the friction member as mentioned above is preferably used.

As materials for the friction member or the friction body, a silicone resin, an SEBS resin (styrene-ethylene-butadiene-styrene block copolymer), an SEPS resin (styrene ethylene propylene styrene block copolymer), a polyester resin, or EPDM (ethylene propylene diene rubber) is suitably used but the SEBS resin is more suitably used since the silicone resin tends to adhere to the portion erased with rubbing and the handwriting tends to be repelled at repeated writing.

The friction member may be a member (frictional body) having any suitable shape separate from the writing instrument, but portability is improved when fixing the frictional body to the writing instrument.

The portion to which the friction member is fixed may be a cap front part (apex part) or a barrel rear part (portion on which a writing front-end is not mounted).

As the cooling tool, for example, a cryogenic discoloration device utilizing a Peltier element, a cryogenic discoloration device loaded with a refrigerant such as cold water or crushed ice, a refrigerator, or a freezer can be suitably used.

In addition, a writing instrument set can also be obtained by combining the writing instrument and a friction body.

Hereinafter, preferred configurations of the ballpoint pen and the ballpoint pen refill according to the present embodiment will be described with reference to the drawings.

<<Ballpoint Pen (First Embodiment)>>

Figures 3, 4:
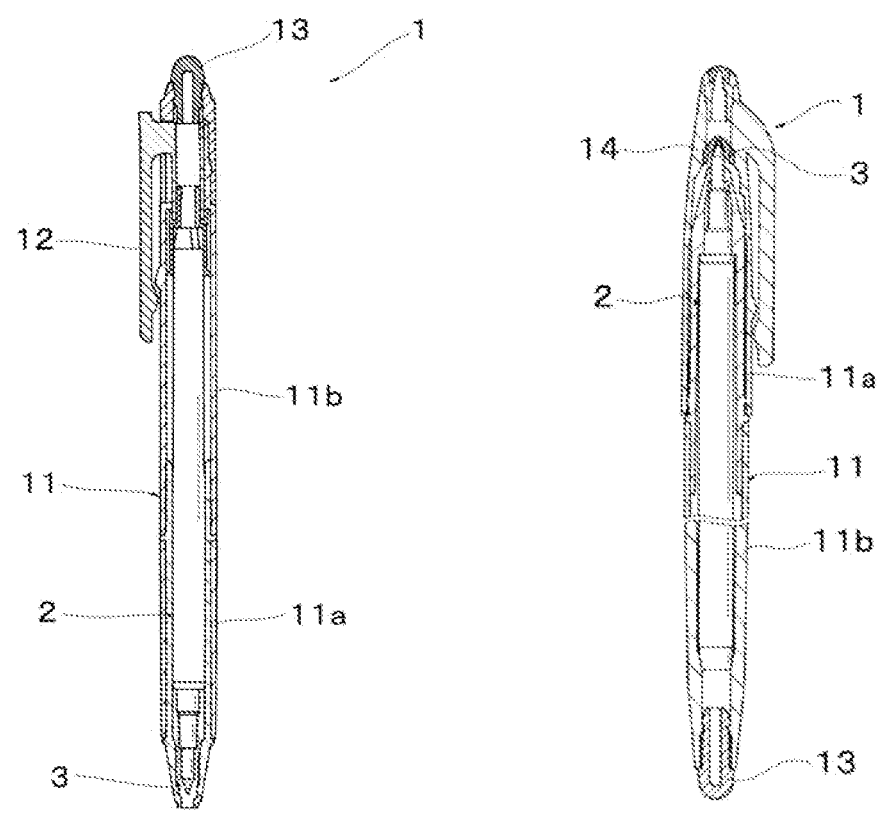
FIG. 3 is a cross-sectional view showing an example of a ballpoint pen of a first embodiment of the present invention.
FIG. 4 is a cross-sectional view showing an example of a ballpoint pen of a second embodiment of the present invention.

FIG. 3 shows a ballpoint pen of the first embodiment.

A ballpoint pen 1 includes an axial barrel 11, a ballpoint pen refill 2 movably accommodated in the axial barrel 11 in a front-rear direction, and an operation portion 12 provided on an outer surface of the axial barrel 11, and is configured such that a ballpoint pen tip 3 (pen tip) of the ballpoint pen refill 2 can be ejected from and put in through a front end hole of the axial barrel 11 by sliding the operation portion 12 (clip) forward.

The axial barrel 11 includes a front shaft 11a and a rear shaft 11b to which the front shaft 11a is detachably screwed, and the ballpoint pen refill 2 inside the axial barrel 11 can be replaced by removing the front shaft 11a from the rear shaft 11b.

A friction body 13 formed from an elastic material (for example, an elastic synthetic resin such as rubber or elastomer) is attached to a rear end of the axial barrel 11. By the friction body 13, a handwriting of a thermochromic ink is rubbed, and the handwriting can be thermally discolored (or decolored) by frictional heat generated at that time.

<<Ballpoint Pen (Second Embodiment)>>

FIG. 4 shows a ballpoint pen of the second embodiment.

A ballpoint pen 1 includes an axial barrel 11, a ballpoint pen refill 2 accommodated in the axial barrel 11, and a cap 14 detachably fitted into an outer surface of the axial barrel 11 on a ballpoint pen tip side (pen tip side), and a ballpoint pen tip 3 (pen tip) of the ballpoint pen refill 2 protrudes outward from a front end hole of the axial barrel 11.

The axial barrel 11 includes a front shaft 11a and a rear shaft 11b to which the front shaft 11a is detachably screwed, and the ballpoint pen refill 2 inside the axial barrel 11 can be replaced by removing the front shaft 11a from the rear shaft 11b.

A friction body 13 formed from an elastic material (for example, an elastic synthetic resin such as rubber or elastomer) is attached to a rear end of the axial barrel 11. By the friction body 13, a handwriting of a thermochromic ink is rubbed, and the handwriting can be thermally discolored (or decolored) by frictional heat generated at that time.

<<Ballpoint Pen Refill>>

Figure 5:
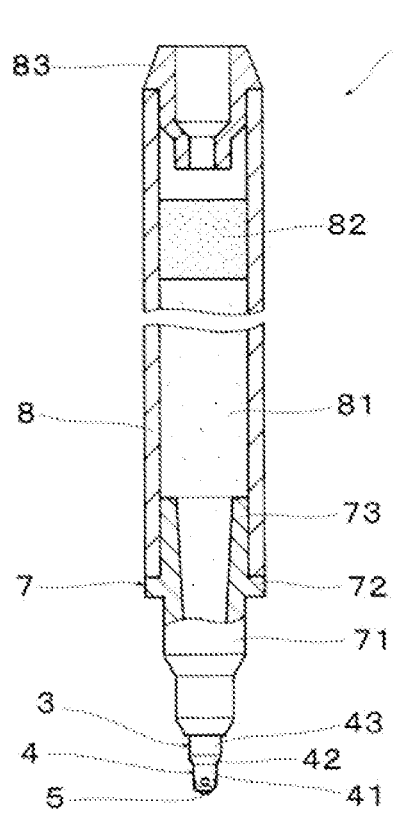
FIG. 5 is a cross-sectional view showing an example of a ballpoint pen refill of the present invention.
Figure 6:
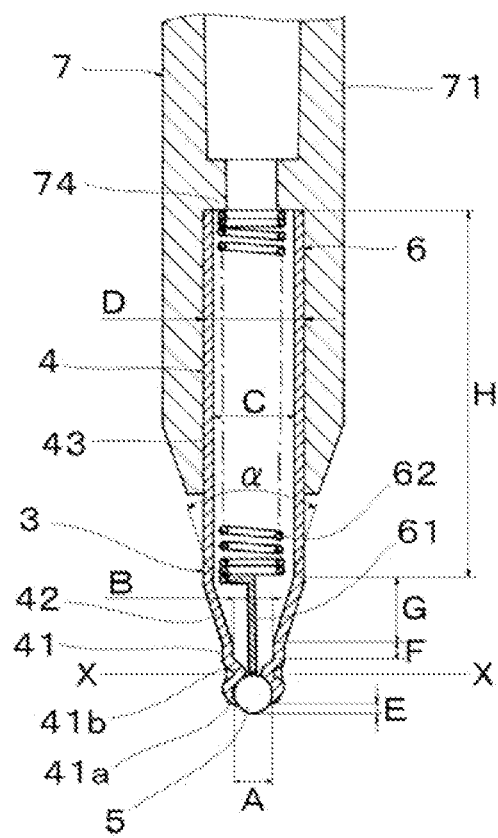
FIG. 6 is a cross-sectional view showing an example of a pen tip (ballpoint pen tip) provided in the ballpoint pen and the ballpoint pen refill of the present invention.
Figure 7:
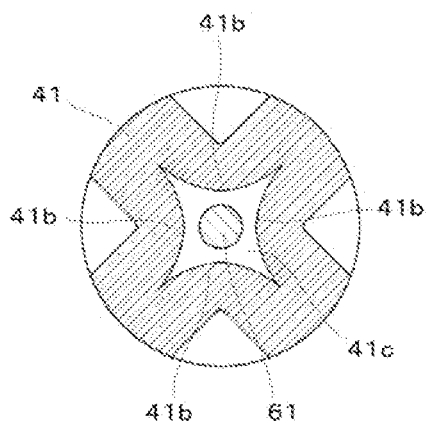
FIG. 7 is a cross-sectional view taken along line X-X of FIG. 6.

FIGS. 5 to 7 shows an embodiment of the ballpoint pen refill 2 used in the ballpoint pen 1.

The ballpoint pen refill 2 of the present embodiment includes the ballpoint pen tip 3 rotatably holding a ball 5 at its front end, a spring 6 accommodated and arranged inside the ballpoint pen tip 3, a holder 7 in which the ballpoint pen tip 3 is press-fitted into and secured to a front portion, and an ink storage cylinder 8 in which a rear portion of the holder is press-fitted into and secured to a front end opening.

In the present embodiment, "front" refers to a pen tip ball side, and "rear" refers to the opposite side.

·Ballpoint Pen Tip

The ballpoint pen tip 3 includes a tip main body 4 and the ball 5. The tip main body 3 is constituted of a metal cylindrical body including a straight cylindrical small-diameter cylindrical portion 41 rotatably holding the ball 5 at its front end, a tapered cylindrical portion 42 connectedly provided integrally more rearward than the small-diameter cylindrical portion 41 and gradually expanding in diameter toward the rear side, and a straight cylindrical large-diameter cylindrical portion 43 connectedly provided integrally more rearward than the tapered cylindrical portion 42. The metal cylindrical body is obtained from, for example, austenitic stainless steel such as SUS304, SUS305, or SUS321.

On an inner surface near the front end of the small-diameter cylindrical portion 41 of the tip main body 3, a plurality of (for example, four) inward protrusions 41b are formed at equal intervals in a circumferential direction by inward press deformation. The inward protrusion 41b forms a ball holding part. An inward front end edge portion 41a is formed at the front end of the tip main body 3 by being pressed and deformed inward in a circumferential shape. The ball holding part rotatably holding the ball 5 is formed between a front surface of the inward protrusion 41b (ball holding part) and a rear surface of the front end edge portion 41a. An ink circulation hole 41c extending radially outward from a center portion and penetrating in an axial direction is formed between the inward protrusions 41b. That is, the ink circulation hole 41c is formed in the ball holding part. The ballpoint pen tip 3 may be of a type in which the ball holding part is formed at a front end portion of the metal tip main body 3 by cutting.

·Straight Cylindrical Inner Surface

A straight cylindrical inner surface is formed on an inner surface of the small-diameter cylindrical portion 41 behind the inward protrusion 41b. The straight cylindrical inner surface is formed on an inner surface of the large-diameter cylindrical portion 43.

·Tapered Inner Surface

A tapered inner surface (or a conical inner surface) whose diameter gradually expands toward the rear is formed on an inner surface of the tapered cylindrical portion 42.

·Spring

In the spring 6, a rod portion 61 at a front portion and a coil portion 62 at a rear portion are connectedly provided integrally by a metal wire material (for example, a stainless steel wire material having a wire diameter of 0.11 mm).

·Rod Portion

The rod portion 61 extends linearly in the axial direction and is inserted through the ink circulation hole 41c of the ball holding part 41b. The front end of the rod portion 61 is abutted against a substantially center portion of a rear surface of the ball 5, and the ball 5 is directly biased forward by the rod portion 61. As a result, the ball 5 is brought into close contact with the inner peripheral surface of the front end edge portion 41a, and leakage of the ink from the front end of the tip main body 3 and evaporation of the ink can be prevented.

·Coil Portion

The coil portion 62 is formed by spirally winding a wire material. An adhesive winding portion in which the wire materials are in close contact with each other is formed at a front end portion and a rear end portion of the coil portion 62. An effective winding portion having a gap between wire materials is formed at an intermediate portion of the coil portion 62 except for the front end portion and the rear end portion. A spring force by which the spring 6 biases the ball 5 forward (specifically, a load when the ball 5 is pressed rearward by 0.01 mm) is set within a range of 14 grams to 25 grams (preferably 15 grams to 22 grams).

·Holder

The holder 7 is a cylindrical body obtained by injection molding of synthetic resin (for example, polypropylene). The holder 7 includes a tapered front portion 71 to which the ballpoint pen tip 3 is attached, a flange portion 72 abutted against a front end surface of the ink storage cylinder 8, and a rear portion 73 press-fitted into the front end opening of the ink storage cylinder 8. A rear portion of the tip main body 3 is press-fitted into and secured to an attachment hole of the front portion 71 of the holder 7. A step portion 74 is projectingly provided at a rear end of an inner surface of the attachment hole, a rear end of the tip main body 3 is locked to the step portion 74, and a rear end of the spring 6 (a rear end of the coil portion 62) is locked to the step portion 74.

·Ink Storage Cylinder

The ink storage cylinder 8 is a cylindrical body obtained by extrusion molding of synthetic resin (for example, polypropylene) and having both ends opened. The inside of the ink storage cylinder 8 is filled with an ink 81 and a following body 82 formed from a high-viscosity fluid that advances with consumption of the ink 81. A tail plug 83 is press-fitted into and secured to a rear end opening of the ink storage cylinder 8. The tail plug 83 has a vent hole that enables communication between the inside of the ink storage cylinder 8 and outside air. The ink 81 is an aqueous ink composition related to the ballpoint pen of the present invention. Examples of the following body 82 include a configuration including only a high-viscosity fluid, and a configuration in which a solid matter is accommodated in a high-viscosity fluid.

·Ball

The ball 5 having a diameter A ranging from 0.25 mm to 0.7 mm (preferably 0.3 mm to 0.5 mm, more preferably 0.3 mm to 0.45 mm) is employed. Specifically, the balls 5 of a plurality of sizes are prepared according to a desired handwriting width, and for example, the balls 5 having diameters of 0.25 mm, 0.3 mm, 0.4 mm, 0.5 mm, and 0.7 mm are employed.

The movable amount of the ball 5 of the ball holding part in the axial direction is preferably within the range of 0.02 mm to 0.05 mm from the viewpoint of achieving smooth ink outflow properties. The movable amount of the ball 5 of the ball holding part in the axial direction varies depending on the diameter A of the ball 5, and is set within a range of 5% to 15% (preferably 8% to 12%) of the diameter A of the ball 5, so that smooth ink outflow properties and a sufficient ball exposure amount can be obtained.

As a material of the ball 4, a metal generally used for a ballpoint pen or the like can be used. Examples thereof include titanium, zirconium, hafnium, vanadium, niobium, tantalum, chromium, molybdenum, and carbides or nitrides of the substances, and carbides of tungsten (tungsten carbides) are preferably used. It is also preferable to use cemented carbide containing these materials as a base material and cobalt as a binder.

When the ball is a cemented carbide containing cobalt, the binder may be made of only cobalt or may contain a metal such as iron or nickel in addition to cobalt. Although the content of cobalt is not particularly limited, in consideration of suppressing alteration of a ball surface and maintaining good lubricity of the ball surface, the content of cobalt is preferably 5 to 20% by mass, more preferably 8 to 15% by mass, based on a total mass of the cemented carbide. Cobalt in the ball can be detected by analysis of energy dispersive X-ray spectroscopy using a scanning electron microscope. For the measurement, an electron microscope (product name: Miniscope TM-1000, manufactured by Hitachi High-Tech Corporation) and an EDX analyzer (product name: Swift ED-TM, manufactured by Oxford, UK) can be used.

An exposure amount E of the ball 5 to a front side in the axial direction is set within a range of 22% to 32% of the diameter A of the ball 5. The exposure amount E of the ball 5 to the front side in the axial direction is measured in a state where the ball 5 is pressed rearward against a forward bias of the spring and the ball 5 is in contact with each of the inward protrusions 41*b* (ball holding parts). The diameter A is within the above range (particularly, the diameter A of the ball 5 is 0.3 mm to 0.45 mm), and when a plurality of kinds of the balls 5 having different diameters are used to obtain a plurality of kinds of the ballpoint pen tips 3, the common spring 6 is used.

·Small-Diameter Cylindrical Portion

When the diameter A of the ball 5 is within the above range (particularly, the diameter A of the ball 5 is 0.3 mm to 0.45 mm), the inner diameter B of the straight cylindrical inner surface of the small-diameter cylindrical portion 41 is set to be larger than the diameter A of the ball 5. Specifically, the inner diameter B of the small-diameter cylindrical portion 41 is set to be larger than the diameter A of the ball 5 by 0.03 mm to 0.06 mm.

A length F in the axial direction of the straight cylindrical inner surface behind the inward protrusion of the small-diameter cylindrical portion 41 is set to be smaller than the diameter A of the ball 5. As a result, the ink is abundantly supplied to the rear surface of the ball 5, and smooth ink outflow properties are obtained.

·Tapered Cylinder Portion

When the diameter A of the ball 5 is within the above range (particularly, the diameter A of the ball 5 is 0.3 mm to 0.45 mm), an angle α (the angle α of the conical inner surface about an axis as the center) of a tapered inner surface of the tapered cylindrical portion 42 is set to 30 degrees to 40 degrees. A length G of the tapered inner surface in the axial direction is set to be larger than the diameter A of the ball 5. Specifically, the length G of the tapered inner surface in the axial direction is set to 1.1 to 5.0 times (preferably 2 to 4.5 times) the diameter A of the ball 5. The tapered cylindrical portion 42 properly connects the small-diameter cylindrical portion 41 and the large-diameter cylindrical portion 43 so as to obtain smooth ink flowability.

·Large-Diameter Cylindrical Portion

When the diameter A of the ball 5 is within the above range (particularly, the diameter A of the ball 5 is 0.3 mm to 0.45 mm), an inner diameter C of the straight cylindrical inner surface of the large-diameter cylindrical portion 43 is set to 0.9 mm or more (preferably 1 mm or more), and the outer diameter D of the straight cylindrical inner surface of the large-diameter cylindrical portion 43 is set to 1.2 mm or more (preferably 1.3 mm or more). A length H in the axial direction of the straight cylindrical inner surface of the large-diameter cylindrical portion 43 is set within a range of 4.0 mm to 5.0 mm.

The diameter A of the ball 5 is within the above range (particularly, the diameter A of the ball 5 is 0.3 mm to 0.45 mm), when the plurality of kinds of balls 5 having different diameters are employed to obtain the plurality of kinds of ballpoint pen tips 3, the inner diameter C of each of the large-diameter cylindrical portions 43 is set to be the same, and the outer diameter D of each of the large-diameter cylindrical portions 43 is set to be the same, whereby a shape of an attachment portion of the ballpoint pen tip 3 to the holder 7 can be made common, and a manufacturing process can be simplified.

The ballpoint pen refill 2 of the present embodiment is required to have at least the following configuration.

The ballpoint pen refill 2 of the present embodiment includes the ballpoint pen tip 3 rotatably holding the ball 5 at its front end, the spring 6 accommodated and arranged inside the ballpoint pen tip 3, the holder 7 to which the rear portion 73 of the ballpoint pen tip 3 is secured, and the ink storage cylinder 8 in which the rear portion 73 of the holder 7 is secured to the front end opening, the inside of the ink storage cylinder 8 is filled with the thermochromic ink 81 and the following body 82 formed from a high-viscosity fluid that advances with consumption of the ink 81 the ballpoint pen tip 3 includes the tip main body 3 constituted of a metal cylindrical body including the straight cylindrical small-diameter cylindrical portion 41 rotatably holding the ball 5 at its front end, the tapered cylindrical portion 42 connectedly provided integrally more rearward than the small-diameter cylindrical portion 41 and gradually expanding in diameter toward the rear side, and the straight cylindrical large-diameter cylindrical portion 43 connectedly provided integrally more rearward than the tapered cylindrical portion 42, the spring force of the spring 6 that biases the ball 5 forward is set within the range of 14 g to 25 g, as the material of the ball 5, cemented carbide containing cobalt in the binder is used, the diameter A of the ball 5 is set to the range of 0.25 mm to 0.7 mm, the movable amount of the ball 5 of the ball holding part in the axial direction is set to the range of 0.02 mm to 0.05 mm, the inner diameter B of the straight cylindrical inner surface of the small-diameter cylindrical portion 41 behind the ball holding part 41*b* is set to be larger than the diameter A of the ball 5 by 0.03 mm to 0.06 mm, the length F in the axial direction of the straight cylindrical inner surface of the small-diameter cylindrical portion 41 behind the ball holding part 41*b* is set to be smaller than the diameter A of the ball 5, and the inner diameter C of the straight cylindrical inner surface of the large-diameter cylindrical portion 43 is set to 0.9 mm or more.

Such a ballpoint pen or ballpoint pen refill structure can provide excellent performance even when an ink composition other than the aqueous ink composition specified in the present invention is combined. In particular, when the ink composition has strong acidity, the surface of a cemented carbide ball may be altered to deteriorate the lubricity of the ball surface. However, when the ink composition is strongly basic, the viscosity of the ink composition may increase due to interaction with a thickener commonly included in the ink composition. Thus, the pH of the ink composition which is combined to the ballpoint pen or ballpoint pen refill described above is preferably 4 or more and less than 7, and preferably 4.5 or more and less than 7. In particular, when the ink composition is the ink composition containing the microcapsule pigment, a ballpoint pen or ballpoint pen refill having excellent properties is obtained. That is, even when the ink composition in which the content of the reversibly thermochromic microcapsule pigment, an N-vinyl-2-pyrrolidone polymer, and glycerin is out of the range specified by the present invention is used, the ballpoint pen or the ballpoint pen refill containing the reversibly thermochromic microcapsule pigment and a thickener, incorporating the reversibly thermochromic aqueous ink composition having a pH value of 4 or more and less than 7, and having a ball made of a cemented carbide containing cobalt as a binder at the pen tip exhibits excellent properties.

EXAMPLES

Hereinafter, the present invention will be described in more detail with reference to Examples, but the present invention is not limited to these Examples.

The average particle diameter of the microcapsule pigment is a volume-based average particle diameter (median diameter) measured using the laser diffraction/scattering-type particle size distribution analyzer (device name: LA-300, manufactured by Horiba, Ltd.) after calibration based on the numerical values measured using a measuring device by the Coulter method (electrical detection band method).

Preparation Example 1: Preparation of Microcapsule Pigment MC1

Preparation of Reversibly Thermochromic Composition

A reversibly thermochromic microcapsule pigment suspension encapsulating a reversibly thermochromic composition containing 4.5 parts of 2-(2-chloroanilino)-6-di-n-butylaminofluorane as the electron-donating color-developing organic compound (component (a)), 4.5 parts of 1,1-bis(4-hydroxyphenyl)n-decane and 7.5 parts of 2,2-bis(4-hydroxyphenyl)hexafluoropropane as the electron-accepting compounds (components (b)), and 50.0 parts of 4-benzyloxyphenylethyl caprate (4-benzyloxyphenylethyl decanoate) as the reaction medium (component (c)) was obtained. The suspension was centrifuged to isolate the reversibly thermochromic microcapsule pigment. The microcapsule pigment had an average particle diameter of 2.5 μm, exhibited a behavior having hysteresis characteristics of $t_1$: −20° C., $t_2$: −9° C., $t_3$: 40° C., $t_4$: 57° C., and ΔH 63° C., and reversibly changed in color from black to colorless and from colorless to black.

Preparation Example 2: Preparation of Microcapsule Pigment MC2

A reversibly thermochromic microcapsule pigment suspension encapsulating a thermochromic color-memory composition containing 2.0 parts of 3-(4-diethylamino-2-hexyloxyphenyl)-3-(1-ethyl-2-methylindole-3-yl)-4-azaphthalide as the electron-donating color-developing organic compound (component (a)), 8.0 parts of 2,2-bis(4-hydroxyphenyl)hexafluoropropane as the electron-accepting compound (component (b)), and 50.0 parts of 4-benzyloxyphenylethyl caprate as the reaction medium (component (c)) was obtained. The suspension was centrifuged to isolate the reversibly thermochromic microcapsule pigment. The microcapsule pigment had an average particle diameter of 2.3 μm, exhibited a behavior having hysteresis characteristics of $t_1$: −14° C., $t_2$: −6° C., $t_3$: 48° C., $t_4$: 60° C., and ΔH 64° C., and reversibly changed in color from blue to colorless and from colorless to blue.

Example 1

The following components were blended and mixed to obtain an ink composition.

Reversibly thermochromic microcapsule (MC1) 18.0% by mass
Polymer of N-vinyl-2-pyrrolidone (polymerization degree 2 to 20) (P1) 5.0% by mass
Glycerin (G) 5.0% by mass
Thickener (V1) 0.2% by mass
(trade name: RHEOZAN, manufactured by Sansho Co., Ltd.)
Polysaccharide (D) 2.0% by mass
(trade name: SANDEC 30, manufactured by Sanwa Starch Co., Ltd.)
Surfactant (S) 0.5% by mass
(manufactured by DKS Co., Ltd., trade name: PLYSURF AL)
pH regulator (B) 0.5% by mass
(triethanolamine)
Preservative (AS) 0.2% by mass
(trade name: Proxel XL-2(S), manufactured by Lonza Japan)
Water (ion-exchanged water) balance The obtained ink composition had a pH of 8.0 at 20° C., the viscosity measured at 20° C. was 780 mPa·s at a rotation speed of 3.84 sec$^{-1}$ and 35.0 mPa·s at a rotation speed of 384 sec$^{-1}$, and the surface tension at 20° C. was 37.0 mN/m.

Examples 2 to 12, Comparative Examples 1 to 8

Ink compositions of Examples 2 to 12 and Comparative Examples 1 to 8 were obtained in the same manner as in Example 1 except that the ink composition was changed to the composition shown in Table 1.

<Preparation of Aqueous Ballpoint Pen Refill>

First, an ink storage tube in which a ballpoint pen tip (trade name: friction ball 05, ball diameter: 0.5 mm, clearance: 43 μm) manufactured by PILOT Corporation was fitted on an end of a polypropylene pipe was filled with the prepared ink composition of each example, and, in addition, an ink follower was brought into close contact with the ink rear end surface and filled therein to obtain a ballpoint pen refill.

For these ballpoint pen refills, the ink consumption amount per 100 m was examined. The ink consumption amount of the ballpoint pen refill containing the ink composition of Example 1 (ball diameter: 0.5 mm) was 280 mg. The same applies to Examples 2 to 9 and 11 to 12 and Comparative Examples 1 to 7 (all having a ball diameter of 0.5 mm). In the aqueous ballpoint pen refill of Example 10 (ball system: 0.5 mm), the ink consumption amount was 230 mg. The ink consumption amount per 100 m of a ballpoint pen refill (ball diameter: 0.5 mm) containing the ink composition of Comparative Example 8 was 160 mg.

In addition, with respect to the ink compositions used in Examples 11 and 12, the ink consumption amount was examined also when the ink composition was filled in another ballpoint pen refill. Specifically, in the first embodiment, a ballpoint pen refill in which balls having a ball diameter of 0.4 mm or 0.5 mm are combined was prepared, and the ballpoint pen refill was filled with the ink composition. The ink consumption amount in each of the cases where the ink compositions of Examples 11 and 12 were combined with a ballpoint pen refill having a ball diameter of 0.4 mm (Examples 11A and 12A) was 220 mg, and the ink consumption amount in each of the cases where the ink compositions were combined with a ballpoint pen refill having a ball diameter of 0.5 mm (Examples 11B and 12B) was 300 mg.

<Evaluation>

After each refill was allowed to stand at 50° C. for 30 days, an initial handwriting density and the dry-up resistance were evaluated. Specifically, while bringing the pen tip into contact with the paper surface, the pen tip was moved so as to draw a circle continuously to form a handwriting. At that time, the handwriting density of a writing start portion was visually confirmed, and the initial density was evaluated according to the following criteria.

A: Sufficient density can be confirmed at the writing start portion

B: The density of the write start portion is slightly low

C: Visual confirmation is hardly possible at the writing start portion

The dry-up resistance was evaluated according to the following criteria by counting the number of circles until the handwriting was formed.

A: faint within one circle
B: faint within three circles
C: faint within six circles
D: faint within twelve circles
E: not writable Here, D and E are practically unavailable levels.

Generally, when the refill is allowed to stand for a long period of time, the pen tip is dried and solidified, for example, and the ink composition is not normally discharged at the start of writing, so that faint or the like may occur in the handwriting. The smaller the faint at the start of writing, the better the dry-up resistance.

The obtained results are as shown in Table 1.

TABLE 1

| Component | | Example 1 | 2 | 3 | 4 | 5 | 6 | 7 | 8 | 9 | 10 | 11 | 12 |
|---|---|---|---|---|---|---|---|---|---|---|---|---|---|
| Pigment | MC1 | 18.0 | | 13.0 | | 18.0 | | 18.0 | 18.0 | 18.0 | 16.0 | 18.0 | |
| | MC2 | | 16.0 | | 20.0 | | 18.0 | | | | | | 16.0 |
| | PIG1 | | | | | | | | | | | | |
| | P1 | 5.0 | 5.0 | 6.5 | 4.5 | 3.0 | 3.0 | 5.0 | 2.0 | 5.0 | 15.0 | 5.0 | 5.0 |
| | P2 | | | | | | | | | | | | |
| Glycerin | G | 5.0 | 5.0 | 6.5 | 4.5 | 3.0 | 3.0 | 2.5 | 7.0 | 1.5 | 10.0 | 5.0 | 5.0 |
| Thickener | V1 | 0.2 | 0.2 | 0.2 | 0.2 | 0.2 | | 0.2 | 0.2 | 0.2 | 0.2 | 0.2 | 0.2 |
| | V2 | | | | | | 0.3 | | | | | | |
| Polysaccharide | D | 2.0 | 2.0 | 2.0 | 2.0 | 2.0 | 2.0 | 2.0 | 2.0 | 2.0 | 2.0 | 2.0 | 2.0 |
| Surfactant | S | 0.5 | 0.5 | 0.5 | 0.5 | 0.5 | 0.5 | 0.5 | 0.5 | 0.5 | 0.5 | 5.0 | 5.0 |
| pH regulator | B | 0.5 | 0.5 | 0.5 | 0.5 | 0.5 | 0.5 | 0.5 | 0.5 | 0.5 | 0.5 | 0.2 | 0.2 |
| Urea | U | | | | | | | | | | | 1.0 | 1.0 |
| Preservative | AS | 0.2 | 0.2 | 0.2 | 0.2 | 0.2 | 0.2 | 0.2 | 0.2 | 0.2 | 0.2 | 0.2 | 0.2 |
| Water | | 68.6 | 70.6 | 70.6 | 67.6 | 72.6 | 72.5 | 71.1 | 69.6 | 72.1 | 55.6 | 67.9 | 69.9 |
| Total | | 100.0 | 100.0 | 100.0 | 100.0 | 100.0 | 100.0 | 100.0 | 100.0 | 100.0 | 100.0 | 100.0 | 100.0 |
| $P_{MC} + P_{PVP} + P_G$ | | 28.0 | 26.0 | 26.0 | 29.0 | 24.0 | 24.0 | 25.5 | 27.0 | 24.5 | 41.0 | 28.0 | 26.0 |
| $P_{MC}/(P_{PVP} + P_G)$ | | 1.8 | 1.6 | 1.0 | 2.2 | 3.0 | 3.0 | 2.4 | 2.0 | 2.8 | 0.6 | 1.8 | 1.6 |
| $P_{PVP}/P_G$ | | 1.0 | 1.0 | 1.0 | 1.0 | 1.0 | 1.0 | 2.0 | 0.3 | 3.3 | 1.5 | 1.0 | 1.0 |
| Initial handwriting density | | A | A | A | A | A | A | A | A | A | A | A | A |
| Dry-up resistance | | A | A | A | B | B | B | B | B | C | C | A | A |
| pH | | 8.0 | 8.0 | 8.0 | 8.0 | 8.0 | 8.0 | 8.0 | 8.0 | 8.0 | 8.0 | 7.5 | 7.5 |
| Surface tention (mN/m) | | 37.0 | 37.0 | 37.0 | 37.0 | 37.0 | 37.0 | 37.0 | 37.0 | 37.0 | 37.0 | 37.0 | 37.0 |
| Viscosity (mPa · s)(rotation speed 3.84 sec$^{-1}$) | | 780 | 750 | 700 | 800 | 720 | 650 | 720 | 700 | 720 | 720 | 780 | 780 |
| Viscosity (mPa · s)(rotation speed 384 sec$^{-1}$) | | 35 | 30 | 32 | 36 | 33 | 33 | 31 | 36 | 32 | 50 | 35 | 30 |

| Component | | Comparative Example 1 | 2 | 3 | 4 | 5 | 6 | 7 | 8 |
|---|---|---|---|---|---|---|---|---|---|
| Pigment | MC1 | 18.0 | | | 18.0 | | 18.0 | | 13.0 |
| | MC2 | | 18.0 | 18.0 | | 18.0 | | | |
| | PIG1 | | | | | | | 16.0 | |
| | P1 | | | 5.0 | 10.0 | | | 5.0 | 30.0 |
| | P2 | | | | | 5.0 | | | |
| Glycerin | G | 5.0 | 10.0 | | | 5.0 | | 5.0 | 20.0 |
| Thickener | V1 | 0.2 | 0.2 | 0.2 | 0.2 | 0.2 | 0.2 | 0.2 | 0.2 |
| | V2 | | | | | | | | |
| Polysaccharide | D | 2.0 | 2.0 | 2.0 | 2.0 | 2.0 | 2.0 | 2.0 | 2.0 |
| Surfactant | S | 0.5 | 0.5 | 0.5 | 0.5 | 0.5 | 0.5 | 0.5 | 0.5 |
| pH regulator | B | 0.5 | 0.5 | 0.5 | 0.5 | 0.5 | 0.5 | 0.5 | 0.5 |
| Urea | U | | | | | | | | |
| Preservative | AS | 0.2 | 0.2 | 0.2 | 0.2 | 0.2 | 0.2 | 0.2 | 0.2 |
| Water | | 73.6 | 68.6 | 73.6 | 68.6 | 68.6 | 78.6 | 70.6 | 33.6 |
| Total | | 100.0 | 100.0 | 100.0 | 100.0 | 100.0 | 100.0 | 100.0 | 100.0 |
| $P_{MC} + P_{PVP} + P_G$ | | 23.0 | 28.0 | 23.0 | 28.0 | 23.0 | 18.0 | 10.0 | 63.0 |
| $P_{MC}/(P_{PVP} + P_G)$ | | 3.6 | 1.8 | 3.6 | 1.8 | 3.6 | — | 0.0 | 0.26 |
| $P_{PVP}/P_G$ | | 0.0 | 0.0 | — | — | 0.0 | — | 1.0 | 1.5 |
| Initial handwriting density | | A | A | A | A | A | A | A | C |
| Dry-up resistance | | D | D | E | D | E | E | E | — |
| pH | | 8.0 | 8.0 | 8.0 | 8.0 | 8.0 | 8.0 | 8.0 | 8.0 |
| Surface tention (mN/m) | | 37.0 | 37.0 | 37.0 | 37.0 | 37.0 | 37.0 | 37.0 | 37.0 |

TABLE 1-continued

| | | | | | | | | |
|---|---|---|---|---|---|---|---|---|
| Viscosity (mPa · s)(rotation speed 3.84 sec$^{-1}$) | 700 | 680 | 720 | 700 | 720 | 700 | 650 | 680 |
| Viscosity (mPa · s)(rotation speed 384 sec$^{-1}$) | 32 | 35 | 32 | 33 | 35 | 28 | 28 | 70 |

In Table:
MC1: Microcapsule pigment MC1
MC2: Microcapsule pigment MC2
PIG1: Titanium oxide (trade name: CR -85, manufactured by ISHIHARA SANGYO KAISHA, LTD., average particle diameter: 0.25 μm)
P1: Polymer of N-vinyl-2-pyrrolidone (polymerization degree: 2 to 20)
P2: ε-caprolactam
V1: Succinoglycan (trade name: RHEOZAN, manufactured by Sansho Co., Ltd.)
V2: Xanthan gum (trade name: KELZAN, manufactured by Sansho Co., Ltd.)
D: Dextrin (sugar mixture containing 94% of octa- or higher starch-saccharified product, trade name: SANDEC 30, manufactured by Sanwa Starch Co., Ltd.)
S: Phosphoric acid ester-based surfactant (trade name: PLYSURF AL, manufactured by DKS Co., Ltd.)
B: Triethanolamine
AS: Trade name: Proxel XL-2(S), manufactured by Lonza Japan The same evaluations were performed for various performances when the ink compositions of Examples 11 and 12 were filled in the ballpoint pen refill according to the first embodiment. The evaluation results of Examples 11A and 11B were equivalent to those of Example 11, and the evaluation results of Examples 12A and 12B were equivalent to those of Example 12.

Figure 8:
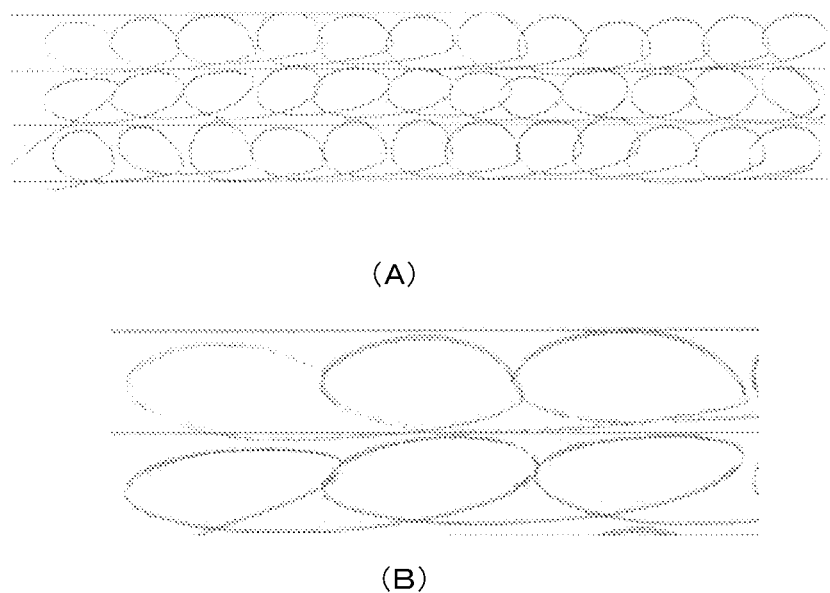
FIG. 8 is a handwriting after evaluation of dry-up resistance when an ink composition of Example is used.
Figure 9:
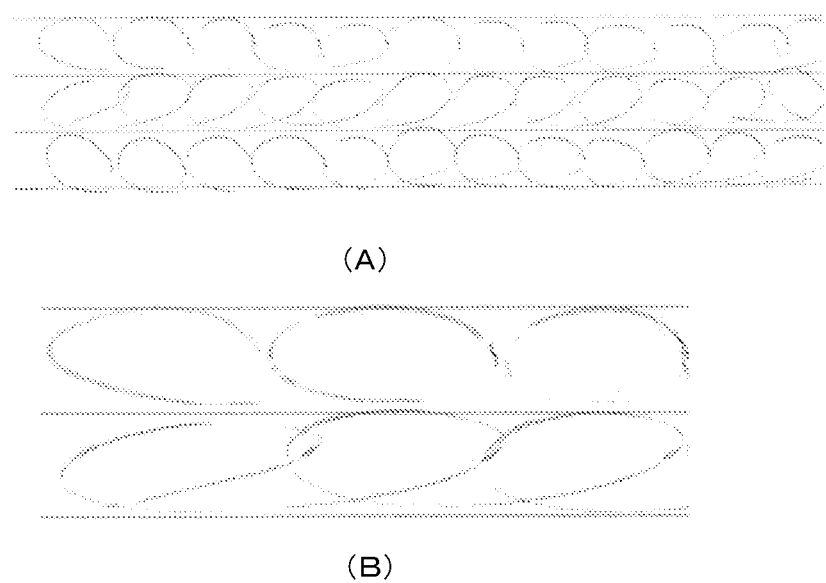
FIG. 9 is the handwriting after evaluation of the dry-up resistance when the ink composition of Comparative Example is used.

FIG. 8 is a diagram illustrating an example of the handwriting in the dry-up performance evaluation. FIG. 8(A) is a photograph of the handwriting after evaluation of dry-up resistance when the ink composition of Example 1 was used, and FIG. 8(B) is an enlarged view of a writing portion of the ink composition (the upper left portion of FIG. 8(A)). FIG. 9(A) is a photograph of the handwriting after evaluation of dry-up resistance when the ink composition of Comparative Example 1 was used, and FIG. 9(B) is an enlarged view of a writing portion of the ink composition (the upper left portion of FIG. 9(A)).

Example 13

The following components were blended and mixed to obtain an ink composition.

Reversibly thermochromic microcapsule (MC2) 10.0% by mass
Bright pigment 1 1.0% by mass
(LG neo SILVER #325 manufactured by Oike Imaging Co., Ltd.)
Bright pigment 2 4.0% by mass
(Iriodin 103 manufactured by Merck KGaA)
Polymer of N-vinyl-2-pyrrolidone (polymerization degree 2 to 20) (P1) 5.0% by mass
Glycerin (G) 5.0% by mass
Urea 1.0% by mass
Thickener (V1) 0.2% by mass
(trade name: RHEOZAN, manufactured by Sansho Co., Ltd.)
Polysaccharide (D) 2.0% by mass
(trade name: SANDEC 30, manufactured by Sanwa Starch Co., Ltd.)
Surfactant (S) 0.5% by mass
(manufactured by DKS Co., Ltd., trade name: PLYSURF AL)
pH regulator (B) 0.2% by mass
(triethanolamine)
Preservative (AS) 0.2% by mass (trade name: Proxel XL-2(S), manufactured by Lonza Japan)
Water (ion-exchanged water) balance

Comparative Example 9

An ink was prepared in the same manner as in Example 13 except that the polymer (polymerization degree: 2 to 20) of N-vinyl-2-pyrrolidone (P1) and glycerin (G) were removed and water (ion-exchanged water) was added.

In Example 13 and Comparative Example 9, an ink storage tube in which a ballpoint pen tip (trade name: friction ball 07, ball diameter: 0.7 mm, clearance: 46 μm) manufactured by PILOT Corporation was fitted on an end of a polypropylene pipe was filled with each ink composition prepared, and, in addition, an ink follower was brought into close contact with the ink rear end surface and filled therein to obtain a ballpoint pen refill.

The ink consumption amount per 100 m of the ballpoint pen refill containing the ink composition of Example 13 was 340 mg.

<Evaluation>

After each refill of Example 13 and Comparative Example 9 was allowed to stand at 50° C. for 15 days, the initial handwriting density and the dry-up resistance were evaluated by a method compatible with Example 1. In Example 13, the initial density and the dry-up resistance were evaluated as A, whereas in Comparative Example 9, although the initial density was evaluated as A, the dry-up resistance was evaluated as D, and it was confirmed that the ink composition of Example 13 was excellent in the dry-up resistance.

Reference Example 1

(Preparation of Reversibly Thermochromic Microcapsule Pigment: Microcapsule Pigment MCA)

A microcapsule pigment encapsulating a reversibly thermochromic composition containing 4.5 parts of 2-(2-chloroanilino)-6-di-n-butylaminofluorane as the component (a),
  4.5 parts of 1,1-bis(4-hydroxyphenyl)n-decane and 7.5 parts of 2,2-bis(4-hydroxyphenyl)hexafluoropropane as the components (b), and
  50.0 parts of 4-benzyloxyphenylethyl caprate as the component (c) ($t_1$: −20° C., $t_2$: −9° C., $t_3$: 40° C., $t_4$: 57° C., ΔH: 63° C., average particle diameter: 2.5 μm, color change from black to colorless and from colorless to black)

(Preparation of Aqueous Ink Composition)

In the reversibly thermochromic microcapsule pigment, the following raw materials, and the following blending amounts, stirring and mixing were performed at room temperature for 1 hour to obtain an aqueous ink composition. When the pH value of the resulting aqueous ink composition was measured using an IM-40S-type pH meter (manufactured by DKK-TOA CORPORATION), the pH value was 5.7 at 20° C.

When the viscosity of the aqueous ink composition was measured with an E-type rotational viscometer (trade name; DV-II viscometer, manufactured by Brookfield Engineering Laboratories, rotor: cone rotor CPE 42), at 20° C., the viscosity at a rotation speed of 3.84 sec$^{-1}$ was 780 mPa·s, and the viscosity at a rotation speed of 384 sec$^{-1}$ was 35.0 mPa·s.

When the surface tension of the aqueous ink composition was measured by a surface tension measuring instrument (in an environment of 20° C., a vertical plate method, manufactured by Kyowa Interface Science, Inc) using a platinum plate, the surface tension was 37.0 mN/m.

Reversibly thermochromic microcapsule pigment (microcapsule pigment MCA) 16% by mass
Thickener (succinoglycan, trade name: RHEOZAN, manufactured by Sansho Co., Ltd.) 0.3% by mass
Sugar (dextrin, trade name: SANDEC 30, manufactured by Sanwa Starch Co., Ltd.) 1% by mass
Phosphoric acid ester-based surfactant (polyoxyethylene aryl ether phosphoric acid, trade name; PLYSURF AL, manufactured by DKS Co., Ltd.) 0.5% by mass
Triethanolamine 0.2% by mass
Phosphoric acid 0.2% by mass
Preservative (benzisothiazoline-3-one, trade name: Proxel XL-2(S), manufactured by Lonza Japan) 0.2% by mass
Water 81.6% by mass Reference Examples 2 to 10, R1 to R6

Ink compositions of Reference Examples 2 to 10 and R1 to R6 were obtained by changing the types and addition amounts of components to be blended as shown in Table 2 with respect to Reference Example 1.

Details of the materials used in the above examples are as follows.

Pigment (1) [reversibly thermochromic microcapsule pigment (the microcapsule pigment MCA)]
Pigment (2) [titanium oxide (trade name: CR-85, manufactured by ISHIHARA SANGYO KAISHA, LTD., average particle diameter: 0.25 µm)]
Thickener (succinoglycan, trade name: RHEOZAN, manufactured by Sansho Co., Ltd.)
Sugar (dextrin, trade name: SANDEC 30, sugar mixture containing 94% of octa- or higher starch-saccharified product, manufactured by Sanwa Starch Co., Ltd.)
Phosphoric acid ester-based surfactant (1) (polyoxyethylene aryl ether phosphoric acid, trade name; PLYSURF AL, manufactured by DKS Co., Ltd.)
Phosphoric acid ester-based surfactant (2) (polyoxyethylene aryl ether phosphoric acid, trade name; Dispersogen LFH, manufactured by Clariant Japan K.K.)
Phosphoric acid ester-based surfactant (3) (polyoxyethylene tridecyl ether phosphoric acid, trade name; PLYSURF A212C, manufactured by DKS Co., Ltd.)
pH regulator (1) triethanolamine
pH regulator (2) phosphoric acid
Preservative (benzisothiazoline-3-one, trade name: Proxel XL-2(S), manufactured by Lonza Japan)
Water-soluble organic solvent (glycerin)
Water The prepared aqueous ink composition was evaluated as follows. The obtained results are as shown in Table 2.

For the evaluation test, the ballpoint pen of the first embodiment was produced and used. The ball diameter of the ballpoint pen was 0.4 mm, and the amount of ink contained in the ballpoint pen was 0.9 g.

In the tables, cobalt contained in the ball was detected by EDX analysis (surface analysis at a magnification of 1000 times) using an electron microscope (product name: Miniscope TM-1000, manufactured by Hitachi High-Tech Corporation). Conditions of the analysis are as follows.

Apparatus: SEM: Miniscope TM-1000 (manufactured by Hitachi High-Tech Corporation)
EDX: Swift ED-TM (manufactured by Oxford, UK)
Electron gun: W hairpin filament type thermionic electron gun
Acceleration voltage: 15 kV
Detector: Silicon drift detector (EDX)
Measurement time: 100 seconds (Evaluation 1 of Faint and Uneven Ink Density of Handwriting)

After the ballpoint pen was left at 50° C. for 60 days, a round handwriting was continuously written by 10 m on a test paper under the writing conditions of a temperature of 20° C., a writing load of 100 g, a writing angle of 70°, and a writing speed of 4 m/min, and the presence or absence of the faint and uneven ink density of the handwriting were visually confirmed. As the test paper, JIS P3201 writing paper A was used.

A: No faint and uneven ink density were observed.

C: Faint and uneven ink density occurred, and visibility of the handwriting is poor. There is a problem in practical use.

(Evaluation 2 of Faint and Uneven Ink Density of Handwriting)

The ballpoint pen used in the evaluation 1 for the faint and the uneven ink density of the handwriting was cooled in the following procedures 1 and 2, and then continuously writing by 10 m was performed to form a round handwriting on the test paper. The faint and the uneven ink density of the handwriting at that time were visually observed. The writing condition and the test paper were the same conditions as in the evaluation 1 for the faint and the uneven ink density of the handwriting.

1. The ballpoint pen is horizontally placed at −20° C. and left for 24 hours to freeze the ink.

2. The ballpoint pen is left at room temperature for 24 hours to thaw the ink.

A: No faint and uneven ink density were observed.

C: Faint and uneven ink density occurred, and visibility of the handwriting is poor. There is a problem in practical use.

(Evaluation of Lubricity of Ball Surface)

Using the ballpoint pen used for the evaluation 2 for the faint and the uneven ink density of the handwriting, it was confirmed whether writing was possible continuously until all the ink was consumed.

A; Writing can be continued continuously until all of the ink is consumed.

B: Although writing can be continued continuously until all the ink is consumed, slight faint and uneven ink density occur in the handwriting immediately before all the ink is consumed. There is no problem in practical use.

C: The ball does not rotate sufficiently before all the ink is consumed, and writing cannot be continued.

TABLE 2

| Configuration | Reference Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | R1 | R2 | R3 | R4 | R5 | R6 |
| Pigment (1) | 16 | 16 | 16 | 16 | 16 | 16 | 16 | 16 | 16 | 16 | 16 | 16 | 16 | 16 | | 18 |
| Pigment (2) | | | | | | | | | | | | | | | 12 | |
| Thickener | 0.3 | 0.3 | 0.2 | 0.2 | 0.2 | 0.2 | 0.3 | 0.3 | 0.2 | 0.2 | 0.3 | 0.3 | 0.3 | 0.3 | 0.3 | |
| Sugar | 1 | 1 | 1 | 1 | 1 | 1 | 1 | 1 | 1 | 1 | 1 | 1 | 1 | 1 | 1 | 1 |
| Phosphoric acid ester-based surfactant (1) | 0.5 | 0.5 | | 0.5 | 0.5 | 1.5 | 0.5 | 0.5 | | | | | 0.2 | 0.5 | 0.5 | 0.5 |
| Phosphoric acid ester-based surfactant (2) | | | 1 | | | | | | 1 | | 1 | 1 | | | | |
| Phosphoric acid ester-based surfactant (3) | | | | | | | | | | 1 | | | | | | |
| pH regulator (1) | 0.2 | 0.2 | 1 | 0.2 | 0.5 | 0.2 | 0.2 | | | | | 0.5 | 1 | | 0.2 | 0.2 |
| pH regulator (2) | 0.2 | 0.1 | | 0.5 | 0.26 | 0.2 | 0.1 | 0.2 | | | | | 0.3 | | 0.1 | 0.1 |
| Preservative | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Water-soluble organic solvent | | 5 | 3 | 6.5 | 5 | | 2 | 4 | 10 | 10 | 5 | 5 | 3 | 6.5 | 10 | 4.5 |
| Water | 81.6 | 76.7 | 76.6 | 74.1 | 74.6 | 78.4 | 79.7 | 77.6 | 71.6 | 71.6 | 76.5 | 76.5 | 78.5 | 74.5 | 75.7 | 75.5 |
| Total | 100 | 100 | 100 | 100 | 100 | 100 | 100 | 100 | 100 | 100 | 100 | 100 | 100 | 100 | 100 | 100 |
| Ball base material | WC | WC | WC | WC | WC | WC | WC | WC | WC | WC | WC | SiC | WC | WC | WC | WC |
| Presence or absence of cobalt contained in ball | Presence (P) | P | P | P | P | P | P | P | P | P | P | Absence (A) | A | P | P | P |
| pH | 5.7 | 6.2 | 6.9 | 6.8 | 4.2 | 6.6 | 6.7 | 5.7 | 6.9 | 6.9 | 6.9 | 6.9 | 3.1 | 8.3 | 6.7 | 6.8 |
| Evaluation (1) of faint and uneven ink density of handwriting | A | A | A | A | A | A | A | A | A | A | A | A | A | A | A | C |
| Evaluation (2) of faint and uneven ink density of handwriting | A | A | A | A | A | A | A | A | A | A | A | A | C | C | C | C |
| Evaluation of lubricity of ball surface | A | A | A | A | A | A | A | A | A | B | C | C | C | A | C | C |

REFERENCE SIGNS LIST t₁ complete coloring temperature of microcapsule pigment of heat-decoloring type
t₂ coloring starting temperature of microcapsule pigment of heat-decoloring type
t₃ decoloring starting temperature of microcapsule pigment of heat-decoloring type
t₄ complete decoloring temperature of microcapsule pigment of heat-decoloring type
ΔH hysteresis width

The invention claimed is:

1. A reversibly thermochromic aqueous ink composition comprising:
a reversibly thermochromic microcapsule pigment in which a reversibly thermochromic composition comprising (a) an electron-donating color-developing organic compound, (b) an electron-accepting compound, and (c) a reaction medium to determine an occurrence temperature of a coloring reaction of the component (a) and the component (b) are encapsulated in a microcapsule comprising an organic resin;
an N-vinyl-2-pyrrolidone polymer having a degree of polymerization of 2 to 20;
glycerin; and
water,
wherein when contents (% by mass) of the reversibly thermochromic microcapsule pigment, the N-vinyl-2-pyrrolidone polymer, and the glycerin with respect to a total mass of the ink composition are $P_{MC}$, $P_{PVP}$, and $P_G$, respectively, $0.6 \leq P_{MC}/(P_{PVP}+P_G) \leq 43.0$, and $0.3 \leq P_{PVP}/P_G \leq 3.3$, wherein the $P_{MC}$ is 13 to 20% by mass and wherein a total of the $P_{MC}$, the $P_{PVP}$, and the $P_G$ is 24.0 to 41.0% by mass.

2. The ink composition according to claim 1, wherein the $P_{PVP}$ is 2.0 to 15.0% by mass, and the $P_G$ is 1.5 to 10.0% by mass.

3. The ink composition according to claim 1, further comprising a polysaccharide.

4. The ink composition according to claim 3, wherein the polysaccharide is succinoglycan or xanthan gum.

5. The ink composition according to claim 1, wherein a content of PVP is 2 to 10% by mass and a content of glycerin is 2 to 10% by mass.

6. A refill comprising the reversibly thermochromic aqueous ink composition according to claim 1.

7. An aqueous ballpoint pen comprising the reversibly thermochromic aqueous ink composition according to claim 1.

8. The aqueous ballpoint pen according to claim 7, wherein said aqueous ballpoint pen is projectable and retractable writing instruments.

9. The aqueous ballpoint pen according to claim 7, wherein a friction member is fixed to said aqueous ballpoint pen.

* * * * *